US012726036B2

(12) United States Patent
Kagami et al.

(10) Patent No.: US 12,726,036 B2
(45) Date of Patent: Sep. 1, 2026

(54) POWER CONVERSION APPARATUS AND PROGRAM PRODUCT

(71) Applicant: DENSO CORPORATION, Kariya-city (JP)

(72) Inventors: Yoshihiro Kagami, Kariya-city (JP); Keisuke Toyama, Kariya-city (JP); Ryoya Kazaoka, Kariya-city (JP); Kaoru Takashima, Kariya-city (JP); Taisuke Kurachi, Kariya-city (JP); Shunichi Kubo, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 19/074,712

(22) Filed: Mar. 10, 2025

(65) Prior Publication Data

US 2025/0210999 A1 Jun. 26, 2025

Related U.S. Application Data

(63) Continuation of application No. PCT/JP2023/030614, filed on Aug. 24, 2023.

(30) Foreign Application Priority Data

Sep. 9, 2022 (JP) ................................ 2022-144019

(51) Int. Cl.
*H02J 7/50* (2026.01)
*H02J 7/00* (2026.01)
(Continued)

(52) U.S. Cl.
CPC ............. *H02J 7/575* (2026.01); *H02J 7/855* (2026.01); *H02J 7/96* (2026.01); *H02M 7/483* (2013.01); *H02J 2207/20* (2020.01)

(58) Field of Classification Search
CPC .... H02J 7/575; H02J 7/855; H02J 7/96; H02J 2207/20; H02J 2105/37; H02J 7/342;
(Continued)

(56) References Cited

U.S. PATENT DOCUMENTS

| | | | |
|---|---|---|---|
| 11,245,346 | B2 | 2/2022 | Chon et al. |
| 2019/0070971 | A1 | 3/2019 | Kusumi et al. |

(Continued)

FOREIGN PATENT DOCUMENTS

| | | | |
|---|---|---|---|
| JP | 2012-060838 | A | 3/2012 |
| JP | 5691981 | B2 | 4/2015 |

(Continued)

*Primary Examiner* — Rexford N Barnie
*Assistant Examiner* — Joshua James Sweet
(74) *Attorney, Agent, or Firm* — Oliff PLC

(57) ABSTRACT

In a power conversion apparatus, a controller starts charging of at least one of a first power storage and a second power storage through an external charger while an inter-storage switch is in an off state and a bypass switch is in an on state, and performs, after the start of charging of the at least one of the first power storage and the second power storage, switching operations of upper- and lower-arm switches of an inverter as a voltage adjustment task to cause an absolute difference between a first voltage across the first power storage and a second voltage across the second power storage to be smaller than or equal to a determination threshold.

22 Claims, 19 Drawing Sheets

(51) Int. Cl.
*H02J 7/96* (2026.01)
*H02M 7/483* (2007.01)

(58) Field of Classification Search
CPC ........ H02J 7/00; H02M 7/483; H02M 7/5387; H02M 7/797
See application file for complete search history.

(56) References Cited

U.S. PATENT DOCUMENTS

| | | | | |
|---|---|---|---|---|
| 2020/0185936 | A1* | 6/2020 | Oishi | H02J 7/575 |
| 2021/0249875 | A1 | 8/2021 | Morimoto et al. | |
| 2021/0351684 | A1 | 11/2021 | Nishimura et al. | |
| 2022/0227256 | A1* | 7/2022 | Yu | B60L 58/19 |
| 2023/0086550 | A1 | 3/2023 | Uchiyama et al. | |
| 2023/0327596 | A1* | 10/2023 | Nishimura | H02M 7/53871 |
| 2024/0348081 | A1* | 10/2024 | Zhu | H02J 7/02 |

FOREIGN PATENT DOCUMENTS

| | | | |
|---|---|---|---|
| JP | 2019-080473 | A | 5/2019 |
| JP | 2022-087465 | A | 6/2022 |

* cited by examiner

HIGH-VOLTAGE CHARGING MODE (800V)

LOW-VOLTAGE CHARGING MODE I (400V)

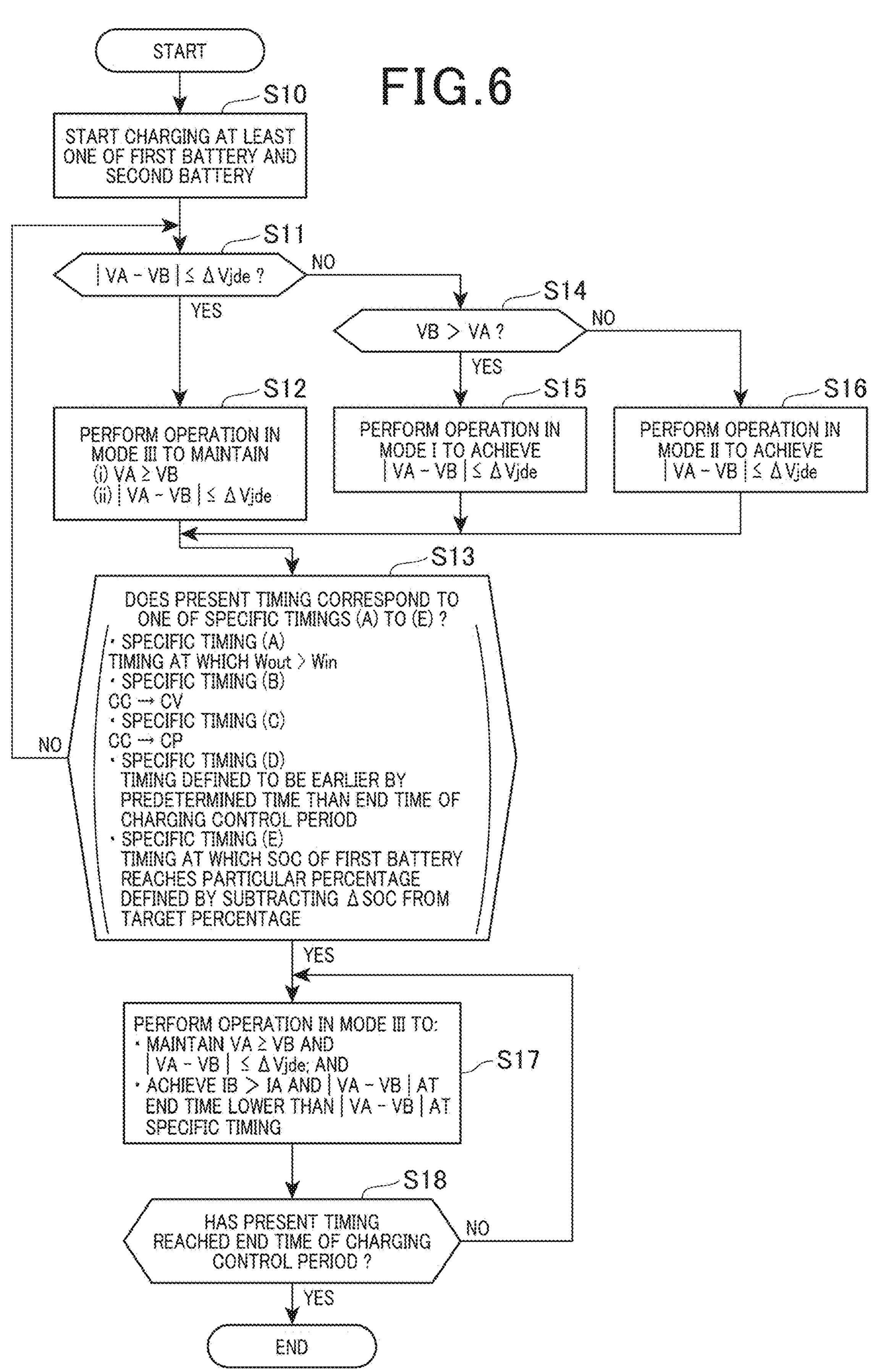

FIG.6
START
S10
START CHARGING AT LEAST ONE OF FIRST BATTERY AND SECOND BATTERY
S11
| VA − VB | ≤ ΔVjde ?
NO
YES
S14
VB > VA ?
NO
YES
S12
PERFORM OPERATION IN MODE III TO MAINTAIN (i) VA ≥ VB (ii) | VA − VB | ≤ ΔVjde
S15
PERFORM OPERATION IN MODE I TO ACHIEVE | VA − VB | ≤ ΔVjde
S16
PERFORM OPERATION IN MODE II TO ACHIEVE | VA − VB | ≤ ΔVjde
S13
DOES PRESENT TIMING CORRESPOND TO ONE OF SPECIFIC TIMINGS (A) TO (E) ?
· SPECIFIC TIMING (A)
TIMING AT WHICH Wout > Win
· SPECIFIC TIMING (B)
CC → CV
· SPECIFIC TIMING (C)
CC → CP
· SPECIFIC TIMING (D)
TIMING DEFINED TO BE EARLIER BY PREDETERMINED TIME THAN END TIME OF CHARGING CONTROL PERIOD
· SPECIFIC TIMING (E)
TIMING AT WHICH SOC OF FIRST BATTERY REACHES PARTICULAR PERCENTAGE DEFINED BY SUBTRACTING ΔSOC FROM TARGET PERCENTAGE
NO
YES
PERFORM OPERATION IN MODE III TO:
· MAINTAIN VA ≥ VB AND | VA − VB | ≤ ΔVjde; AND
· ACHIEVE IB > IA AND | VA − VB | AT END TIME LOWER THAN | VA − VB | AT SPECIFIC TIMING
S17
S18
HAS PRESENT TIMING REACHED END TIME OF CHARGING CONTROL PERIOD ?
NO
YES
END

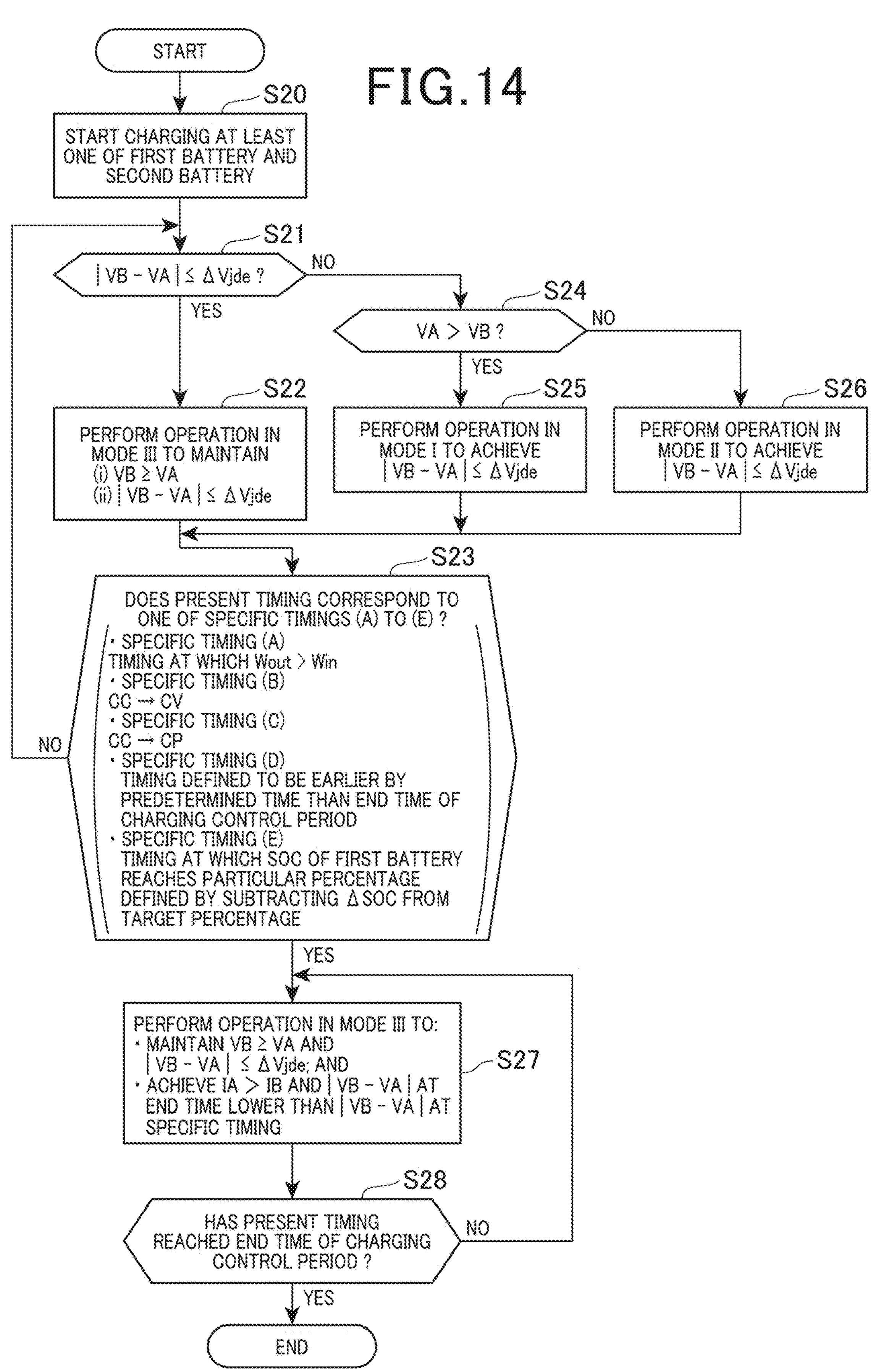
FIG.14
START
S20
START CHARGING AT LEAST ONE OF FIRST BATTERY AND SECOND BATTERY
S21
| VB − VA | ≤ ΔVjde ?
YES
NO
S24
VA > VB ?
YES
NO
S22
PERFORM OPERATION IN MODE III TO MAINTAIN (i) VB ≥ VA (ii) | VB − VA | ≤ ΔVjde
S25
PERFORM OPERATION IN MODE I TO ACHIEVE | VB − VA | ≤ ΔVjde
S26
PERFORM OPERATION IN MODE II TO ACHIEVE | VB − VA | ≤ ΔVjde
S23
DOES PRESENT TIMING CORRESPOND TO ONE OF SPECIFIC TIMINGS (A) TO (E) ?
· SPECIFIC TIMING (A)
TIMING AT WHICH Wout > Win
· SPECIFIC TIMING (B)
CC → CV
· SPECIFIC TIMING (C)
CC → CP
· SPECIFIC TIMING (D)
TIMING DEFINED TO BE EARLIER BY PREDETERMINED TIME THAN END TIME OF CHARGING CONTROL PERIOD
· SPECIFIC TIMING (E)
TIMING AT WHICH SOC OF FIRST BATTERY REACHES PARTICULAR PERCENTAGE DEFINED BY SUBTRACTING ΔSOC FROM TARGET PERCENTAGE
NO
YES
S27
PERFORM OPERATION IN MODE III TO:
· MAINTAIN VB ≥ VA AND | VB − VA | ≤ ΔVjde; AND
· ACHIEVE IA > IB AND | VB − VA | AT END TIME LOWER THAN | VB − VA | AT SPECIFIC TIMING
S28
HAS PRESENT TIMING REACHED END TIME OF CHARGING CONTROL PERIOD ?
NO
YES
END

POWER CONVERSION APPARATUS AND PROGRAM PRODUCT

CROSS REFERENCE TO RELATED APPLICATION

This application is a bypass continuation application of currently pending international application No. PCT/JP2023/030614 filed on Aug. 24, 2023 designating the United States of America, the entire disclosure of which is incorporated herein by reference, the international application being based on and claiming the benefit of priority from Japanese Patent Application No. 2022-144019 filed on Sep. 9, 2022, the disclosure of which is incorporated in its entirety herein by reference.

TECHNICAL FIELD

The present disclosure relates to power conversion apparatuses and program products.

BACKGROUND

Known power supply apparatuses, one of which is disclosed in Japanese Patent Application Publication No. 2021-126027, are configured such that the connection of each of a first battery and a second battery to an external device is switched between series-connection and parallel connection. The power supply apparatus disclosed in the patent publication includes a relay that changes the connection of each of the first battery and second battery to an external power charter as an external device between the series connection and the parallel connection.

In particular, the power supply apparatus disclosed in the patent publication controls the relay to enable one of the first and second batteries, whose terminal voltage is lower than the other thereof, to be chargeable by the external charger upon determination that the difference in terminal voltage between the first and second batteries is greater than or equal to a predetermined threshold voltage. This enables the terminal voltages of the respective first and second batteries to balance one another.

In contrast, the power supply apparatus disclosed in the patent publication controls the relay to change the connection of each of the first and second batteries to the external charger to the parallel connection thereto upon determination that the difference in terminal voltage between the first and second batteries is lower than the predetermined threshold voltage, resulting in both the first and second batteries being chargeable by the external charger. This prevents the connection of each of the first and second batteries to the external charger from being switched to the parallel connection when the difference in terminal voltage between the first and second batteries is greater than or equal to the predetermined threshold voltage, making it possible to prevent a rush current due to this switching from flowing into each of the first and second batteries.

SUMMARY

Users desire new power conversion apparatuses, each of which is capable of enabling the connection between (i) an external charger and (ii) each of a first power storage, such as a first battery, and a second power storage, such as a second battery to be switched among plural connection conditions.

From the above viewpoint, the present disclosure seeks to provide power conversion apparatuses, each of which is capable of causing the connection between (i) an external charger and (ii) each of a first power storage and a second power storage to be switchable among plural connection conditions.

An exemplary aspect of the present disclosure provides a power conversion apparatus. The power conversion apparatus includes a high-side electrical path electrically connectable to a positive terminal of a first power storage and a positive terminal of an external charger, and a low-side electrical path electrically connectable to a negative terminal of a second power storage and a negative terminal of the external charger.

The power conversion apparatus includes an inverter that includes an upper-arm switch electrically connected to the high-side electrical path and a lower-arm switch connected to the upper-arm switch and the low-side electrical path. The power conversion apparatus includes a motor electrically connected to a connection point between the upper-arm switch and the lower-arm switch through a conductor.

The power conversion apparatus includes an inter-storage electrical path arranged to connect between a negative terminal of the first power storage and a positive terminal of the second power storage, an inter-storage switch mounted on the inter-storage electrical path, a bypass switch arranged to perform at least one of a first electrical connection between the negative terminal of the first power storage and the negative terminal of the second power storage, a second electrical connection between the positive terminal of the first power storage and the positive terminal of the second power storage, a motor-side electrical path arranged to electrically connect between the inter-storage electrical path and one of the armature winding and the conductor, and a controller.

The controller is configured to start charging of at least one of the first power storage and the second power storage through the external charger while the inter-storage switch is in an off state and the bypass switch is in an on state. The controller is configured to perform, after the start of charging of the at least one of the first power storage and the second power storage, switching operations of the upper- and lower-arm switches of the inverter as a voltage adjustment task to cause an absolute difference between a first voltage across the first power storage and a second voltage across the second power storage to be smaller than or equal to a determination threshold.

When the inter-storage switch is turned on and the bypass switch is turned off in the power conversion apparatus of the exemplary aspect, the first and second power storages are connected to be in series to the external charger. In contrast, when the inter-storage switch is turned off and the bypass switch is turned on in the power conversion apparatus of the exemplary aspect, one of the first and second power storages is connected in parallel to the external charger. The power conversion apparatus of the exemplary aspect therefore can select one of the connection conditions of the first and second power storages to the external charger.

The controller of the power conversion apparatus of the exemplary aspect starts charging of at least one of the first power storage and the second power storage through the external charger while the inter-storage switch is in the off state and the bypass switch is in the on state. After the start of charging of the at least one of the first power storage and the second power storage, the controller is configured to perform switching operations of the upper- and lower-arm switches of the inverter as the voltage adjustment task to cause the absolute difference between the first voltage across the first power storage and the second voltage across the second power storage to be smaller than or equal to the determination threshold.

Execution of the switching operations enables power to be transferred between the first power storage and the second power storage through the inverter and the armature winding, resulting in the absolute difference between the first voltage across the first power storage and the second voltage across the second power storage being smaller than or equal to the determination threshold.

The above configuration of the power conversion apparatus of the exemplary aspect therefore prevents a large amount of current from flowing, due to the large absolute difference between the first and second voltages, from one of the first and second power storages to the other thereof through the inverter and the armature winding.

BRIEF DESCRIPTION OF THE DRAWINGS

Other aspects of the present disclosure will become apparent from the following description of embodiments with reference to the accompanying drawings in which:

FIG. 6 is a flowchart illustrating a charging routine for first and second batteries according to the first embodiment;

FIG. 14 is a flowchart illustrating a charging routine for the first and second batteries according to the second embodiment;

DETAILED DESCRIPTION OF EMBODIMENTS

The following describes plural embodiments with reference to the accompanying drawings. Parts of the embodiments functionally or structurally corresponding to each other or associated with each other will be denoted by the same reference numbers or by reference numbers which are different in the hundreds place from each other. The corresponding or associated parts may refer to the corresponding descriptions in the other embodiments.

First Embodiment

The following describes the first embodiment, which is created by implementing one of power conversion apparatuses according to the present disclosure, with reference to the accompanying drawings.

A power conversion apparatus according to the first embodiment is installed in, for example, an electric vehicle or a hybrid vehicle CA to constitute a vehicular system.

Figure 1:
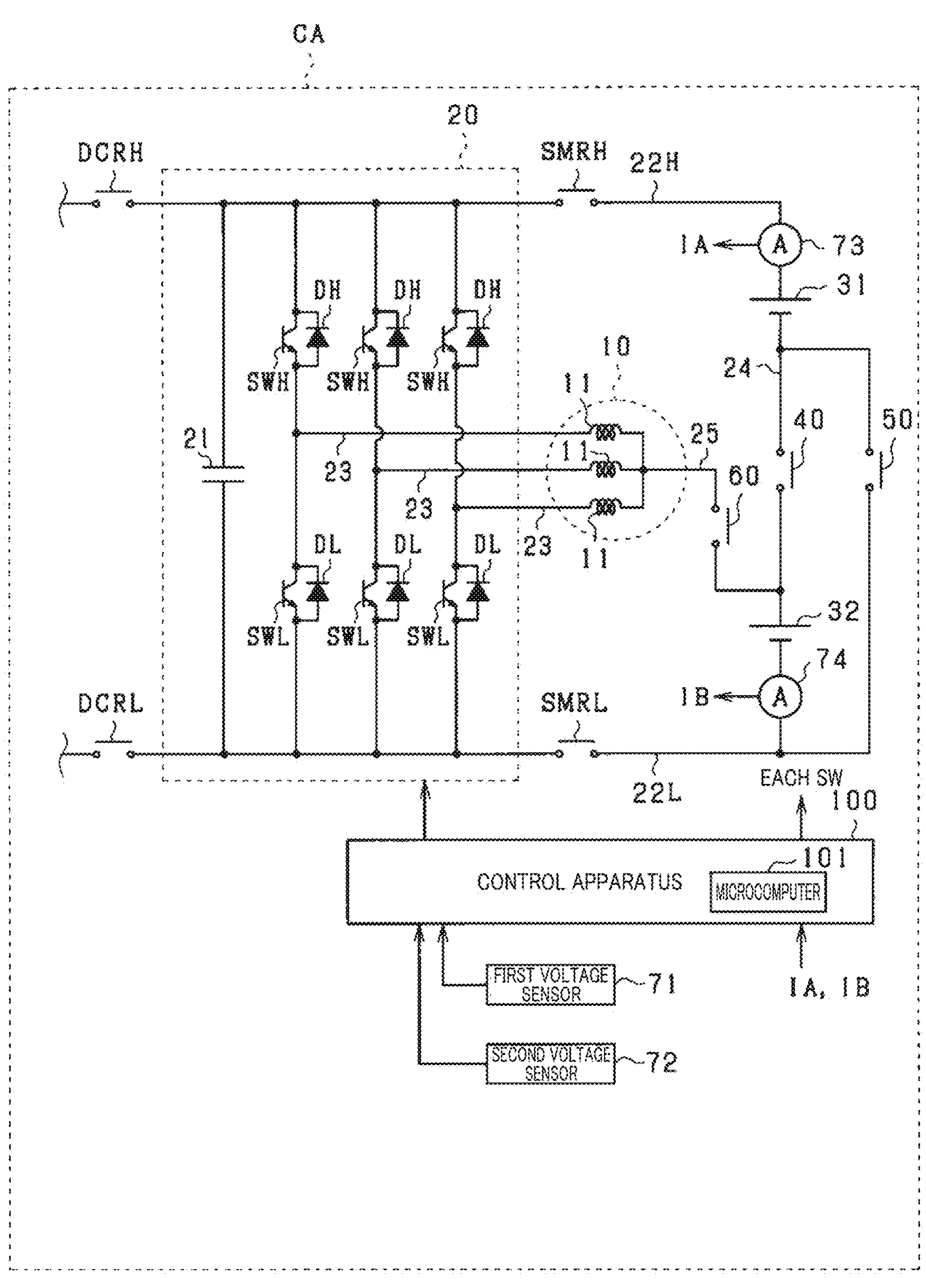
FIG. 1 is an overall structural diagram of a vehicular system according to the first embodiment.

The power conversion apparatus of the first embodiment included in the vehicular system installed in the vehicle CA includes, as illustrated in FIG. 1, a motor 10, an inverter 20, a high-side power path 22H, and a low-side power path 22L.

The motor 10 is configured as a three-phase synchronous machine, and includes an unillustrated rotor and three-phase (UVW-phase) armature windings 11 connected in star configuration. The UVW-phase armature windings 11 are arranged to have a phase difference of 120 electrical degrees from each other. The motor 10 is, for example, configured as a permanent magnet synchronous machine. The rotor of the motor 10 is configured to transmit and receive power to and from one or more driving wheels of the vehicle CA. This therefore enables the motor 10 to serve as a torque generator for generating torque that propels the vehicle CA.

The inverter 20 includes three-phase (UVW-phase) series-connected switch units for the respective three-phases of the motor 10; the series-connected switch unit for each of the U-, V-, and W-phases is comprised of an upper-arm switch SWH and a lower-arm switch SWL connected in series to each other. An upper-arm diode DH, which serves as a free wheel diode, is connected in antiparallel to the upper-arm switch SWH of each phase, and a lower-arm diode DL, which serves as a free wheel diode, is connected in antiparallel to the lower-arm switch SWL of each phase. The first embodiment uses, as each of the upper- and lower-arm switches, an Insulated Gate Bipolar Transistor (IGBT).

The inverter 20 includes a smoothing capacitor 21 that has a high-side terminal and a low-side terminal. Each of the high- and low-side electrical paths 22H and 22L, which has an elongated shape, has opposing first and second ends. The first end of the high-side electrical path 22H is connected to the high-side terminal of the smoothing capacitor 21, and the first end of the low-side electrical path 22L is connected to the low-side terminal of the smoothing capacitor 21. The smoothing capacitor 21 can be arranged outside the inverter 20.

The emitter of the upper-arm switch SWH of each phase is connected to the collector of the lower-arm switch SWL of the corresponding phase. The connection point between the emitter of the upper-arm switch SWH of each phase and the collector of the lower-arm switch SWL of the corresponding phase is connected to a first end of the corresponding phase armature winding 11 through a conductor, such as a busbar, 23. The second ends of the respective three-phase armature windings 11 are connected to a neutral point.

The number of turns of each phase armature winding 11 is set to a predetermined constant value, so that, for example, the inductance of each phase armature winding 11 is set to a predetermined constant value.

The collector of each-phase upper-arm switch SWH is connected to the first end of the high-side electrical path 22H, and the emitter of each-phase lower-arm switch SWL is connected to the first end of the low-side electrical path 22L.

The vehicular system includes a first battery 31 serving as a first power storage unit, and a second battery 32 serving as a second power storage unit. Each of the first and second batteries 31 and 32 serves as a power storage for rotatably driving the rotor of the motor 10.

Each of the first and second batteries 31 and 32 is a battery pack configured as a series module comprised of a plurality of battery cells, i.e., unit cells, connected in series to each other. Each of the first and second batteries 31 and 32 has opposing positive and negative terminals. The positive terminal of the first battery 31 is connected to the second end of the high-side electrical path 22H, and the negative terminal of the second battery 32 is connected to the second end of the low-side electrical path 22L.

A terminal voltage, such as a rated voltage, across each battery cell that constitutes the battery pack is set to a predetermined constant value. For example, a secondary battery cell, such as a lithium-ion cell, can be used as each battery cell.

The rated voltage of the first battery 31 is set to be identical to that of the second battery 32. The first battery 31 has a predetermined full-charge capacity, and the second battery 32 has a predetermined full-charge capacity that is the same as the full-charge capacity of the first battery 31.

Each of the first and second batteries 31 and 32 is configured to be chargeable by an external charger, which will be described later, located outside the vehicle CA. The external charger is configured as, for example, a stationary charger. A positive-side connector is mounted to the first end of the high-side electrical path 22H; the positive-side connector enables a positive terminal of the external charger to be connected thereto. A negative-side connector is mounted to the first end of the low-side electrical path 22L; the negative-side connector enables a negative terminal of the external charger to be connected thereto.

The power conversion apparatus includes main switches that (i) electrically connect between the inverter 20 and the first and second batteries 21 and 22, and (ii) cut off the electrical connection therebetween. Specifically, a high-side main switch SMRH and a low-side main switch SMRL are provided as the main switches.

The power conversion apparatus additionally includes charge switches that (i) electrically connect between the inverter 20 and the external charger, and (ii) cut off the electrical connection therebetween. Specifically, a high-side charge switch DCRH and a low-side charge switch DCRL are provided as the charge switches. A mechanical relay is used as each of the switches SMRH, SMRL, DCRH, and DCRL according to the first embodiment.

Each switch SMRH, SMRL, DCRH, and DCRL is configured to enable a current to bidirectionally pass therethrough when turned on, and each switch SMRH, SMRL, DCRH, and DCRL is configured to bidirectionally cut off the current therethrough when turned off.

The high-side main switch SMRH and the high-side charge switch DCRH are mounted on the high-side electrical path 22H in this order from the first-battery side. The low-side main switch SMRL and the low-side charge switch DCRL are mounted on the low-side electrical path 22L in this order from the second-battery side. A semiconductor switching device can be used as each of the switches SMRH, SMRL, DCRH, and DCRL according to the first embodiment.

The power conversion apparatus additionally includes, as switches for switching among connection modes of each of the first and second batteries 31 and 32 to the external charger, an inter-battery switch 40, a negative-terminal bypass switch 50, and a motor-side switch 60. A mechanical relay is used as each of the switches 40, 50, and 60.

Each switch 40, 50, and 60 is configured to enable a current to bidirectionally pass therethrough when turned on, and each switch 40, 50, and 60 is configured to bidirectionally cut off the current therethrough when turned off. A semiconductor switching device can be used as each of the switches 40, 50, and 60 according to the first embodiment.

The inter-battery switch 40 is mounted on an inter-battery electrical path 24 connecting between the negative terminal of the first battery 31 and the positive terminal of the second battery 32. The negative terminal of the first battery 31 and the positive terminal of the second battery 32 are electrically connected to each other when the inter-battery switch 40 is turned on. In contrast, the electrical connection between the negative terminal of the first battery 31 and the positive terminal of the second battery 32 is cut off when the inter-battery switch 40 is turned off.

The negative-terminal bypass switch 50 is arranged to connect between the negative terminal of the first battery 31 and the negative terminal of the second battery 32. The negative terminal of the first battery 31 and the negative terminal of the second battery 32 are electrically connected to each other when the negative-terminal bypass switch 50 is turned on. In contrast, the electrical connection between the negative terminal of the first battery 31 and the negative terminal of the second battery 32 is cut off when the negative-terminal bypass switch 50 is turned off.

The inter-battery electrical path 24 is comprised of a first section between the inter-battery switch 40 and the negative terminal of the first battery 31 and a second section between the inter-battery switch 40 and the positive terminal of the second battery 32. A motor-side electrical path 25 is arranged to connect between any point on the second section of the inter-battery electrical path 24 and the neutral point of the armature windings 11. The motor-side switch 60 is mounted on the motor-side electrical path 25.

The neutral point of the armature windings 11 and the positive terminal of the second battery 32 are electrically connected to each other when the motor-side switch 60 is turned on. In contrast, the electrical connection between the neutral point of the armature windings 11 and the positive terminal of the second battery 32 is cut off when the motor-side switch 60 is turned off.

The power conversion apparatus includes a first voltage sensor 71 and a second voltage sensor 72. The first voltage sensor 71 is configured to measure a terminal voltage across the first battery 31, and the second voltage sensor 72 is configured to measure a terminal voltage across the second battery 32.

The power conversion apparatus additionally includes a first current sensor 73 and a second current sensor 74. The first current sensor 73 is configured to measure a current flowing through the first battery 31, and the second current sensor 74 is configured to measure a current flowing through the second battery 32. The first current sensor 73 is mounted on an electrical path connecting between the positive terminal of the first battery 31 and the positive-side electrical path 22H. The second current sensor 74 is mounted on an electrical path connecting between the negative terminal of the second battery 32 and the negative-side electrical path 22L. The power conversion apparatus includes a rotational angle sensor for measuring a rotational angle, such as a rotational electric angle, of the rotor of the motor 10. The power conversion apparatus additionally includes one or more current sensors for measuring three-phase currents flowing through the respective phase armature windings 11.

The power conversion apparatus includes a control apparatus 100, which serves as a controller. The measurements of the above respective sensors are inputted to the control apparatus 100.

The control apparatus 100 is comprised mainly of a microcomputer 101 that includes a Central Processing Unit (CPU). Functions provided by the microcomputer 101 can be implemented by software stored in a non-transitory storage medium and one or more computers that runs the software, only software, only one or more hardware devices, or the combination of software and one or more hardware devices. For example, if the microcomputer 101 is comprised of electronic circuits as hardware devices, the functions of the microcomputer 101 can be implemented by digital circuits including many logic circuits or analog circuits. For example, the microcomputer 101 is configured to execute programs stored in a storage unit, such as a non-transitory tangible storage medium. The programs include processing programs illustrated in FIG. 6 and other figures described later. Execution of the programs stored in the storage unit enables methods corresponding to the programs to be carried out. The storage unit is for example comprised of a non-volatile memory device. The programs stored in the storage unit can be updated through communication networks, such as an Over-The-Air (OTA) network or the Internet.

The control apparatus 100 is configured to perform, based on the measurements of the above sensors, a switching control task for the switches SWH and SWL constituting the inverter 20 to accordingly control a controlled variable, such as torque, of the motor 10 to be fed back to a target value for the controlled variable. That is, the switching control task alternately turns on the upper- and lower-arm switches SWH and SWL for each phase to accordingly control the controlled variable, such as torque, of the motor 10 to be fed back to the target value for the controlled variable. The above feedback control task causes rotary power of the rotor of the motor 10 to be transmitted to the driving wheels of the vehicle CA, resulting in the vehicle CA traveling.

The positive-side connector of the high-side electrical path 22H and the negative-side connector of the low-side electrical path 22L serve as interfaces to be connected to the external charger. The external charger according to the first embodiment is a high-voltage charger 200 or a low-voltage charger 210 (see FIGS. 2 to 5). A charging voltage of the high-voltage charger 200 is set to be substantially identical to the terminal voltage, more specifically, the rated voltage, across a series battery module comprised of the series-connected first and second batteries 31 and 32. For example, the charging voltage of the high-voltage charger 200 is set to 800 V. A charging voltage of the low-voltage charger 210 is set to be lower than the rated voltage across the series battery module comprised of the series-connected first and second batteries 31 and 32. For example, the charging voltage of the low-voltage charger 210 is set to 400 V.

For example, if the external charger is connected to the positive- and negative-side connectors of the high- and low-side electrical paths 22H and 22L by user or an operator to charge the first and second batteries 31 and 32 by the external charger, the control apparatus 100 switches each of the high- and low-side charge switches DCRH and DCRL from an off state to an on state.

Otherwise, if the external charger is not connected to the positive- and negative-side connectors of the high- and low-side electrical paths 22H and 22L or it is not to perform charging of the first and second batteries 31 and 32, the control apparatus 100 maintains each of the high- and low-side charge switches DCRH and DCRL in the off state. If at least one of the positive- and negative-side connectors of the high- and low-side electrical paths 22H and 22L is exposed from housing of the power conversion apparatus to the outside thereof, a user or an operator might touch the exposed at least one of the positive- and negative-side connectors. From this viewpoint, the control apparatus 100 turns off each of the high- and low-side charge switches DCRH and DCRL or maintains each of the high- and low-side charge switches DCRH and DCRL in the off state. This prevents a user or an operator from receiving electrical shocks due to the exposure of the positive- and negative-side connectors of the high- and low-side electrical paths 22H and 22L.

The control apparatus 100 is configured to select one of a high-voltage charging mode and a low-voltage charging mode and perform operations in the selected one of the high-voltage charging mode and low-voltage charging mode. In the high-voltage charging mode, the control apparatus 100 causes the high-voltage charger 200 to charge at least one of the first and second batteries 31 and 32. In the low-voltage charging mode, the control apparatus 100 causes the low-voltage charger 210 to charge at least one of the first and second batteries 31 and 32.

First, the following describes the high-voltage charging mode.

When determining that the external charger connected to each of the positive- and negative-side connectors is the high-voltage charger 200, the control apparatus 100 performs the operations in the high-voltage charging mode. Specifically, in the high-voltage charging mode, the control apparatus 100 turns on the inter-battery switch 40 and the main switches SMRH and SMRL and turns off or maintains in the off state the negative-terminal bypass switch 50, the motor-side switch 60, and the upper- and lower-arm switches SWH and SWL to cause the first and second batteries 31 and 32 to be connected in series to the high-voltage charger 200.

Figure 2:
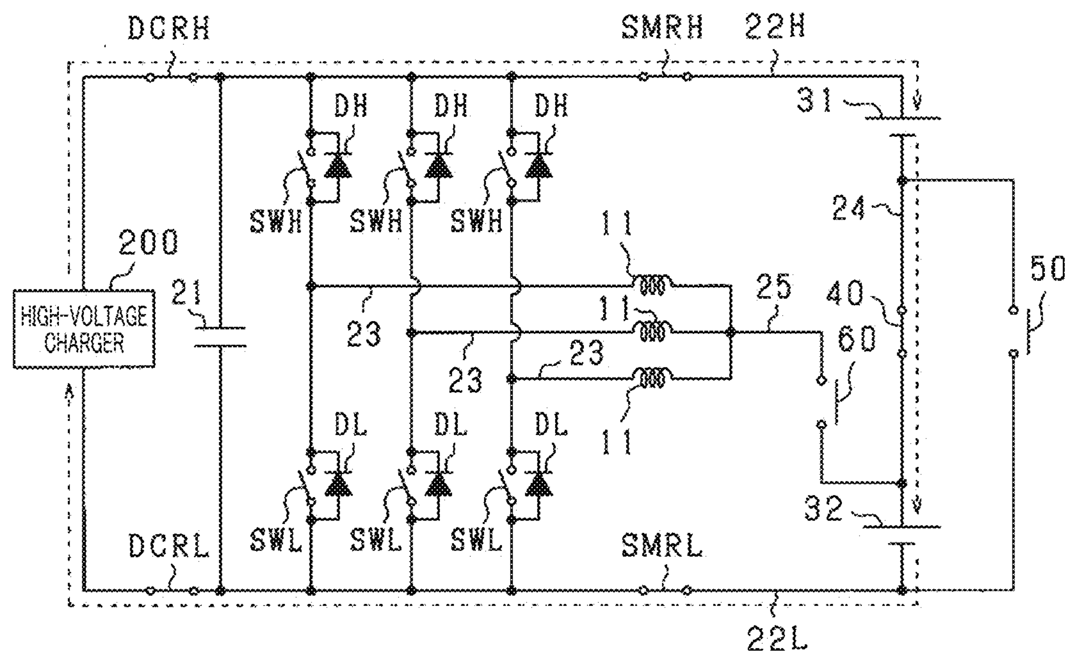
FIG. 2 is a circuit diagram illustrating how switches are operated in a high-voltage charging mode.

This results in, as illustrated in FIG. 2, a charging current flowing in a closed circuit loop that includes the high-voltage charger 200, the high-side electrical path 22H, the first battery 31, the inter-battery switch 40, the second battery 32, and the low-side electrical path 22L, making it possible to charge the first and second batteries 31 and 32 while they are connected in series to each other. In the high-voltage charging mode, the upper-arm switches SWH of the inverter 20 and the motor-side switch 60 are controlled to be in the off state, making it possible to prevent the charging current from the high-voltage charger 200 from flowing into the inverter 20 and the armature windings 11.

Next, the following describes the low-voltage charging mode.

When determining that the external charger connected to each of the positive- and negative-side connectors is the low-voltage charger 210, the control apparatus 100 performs the operations in the low-voltage charging mode. As the low-voltage charging mode, one of a low-voltage charging mode I, a low-voltage charging mode II, and a low-voltage charging mode III can be used.

Figure 3:
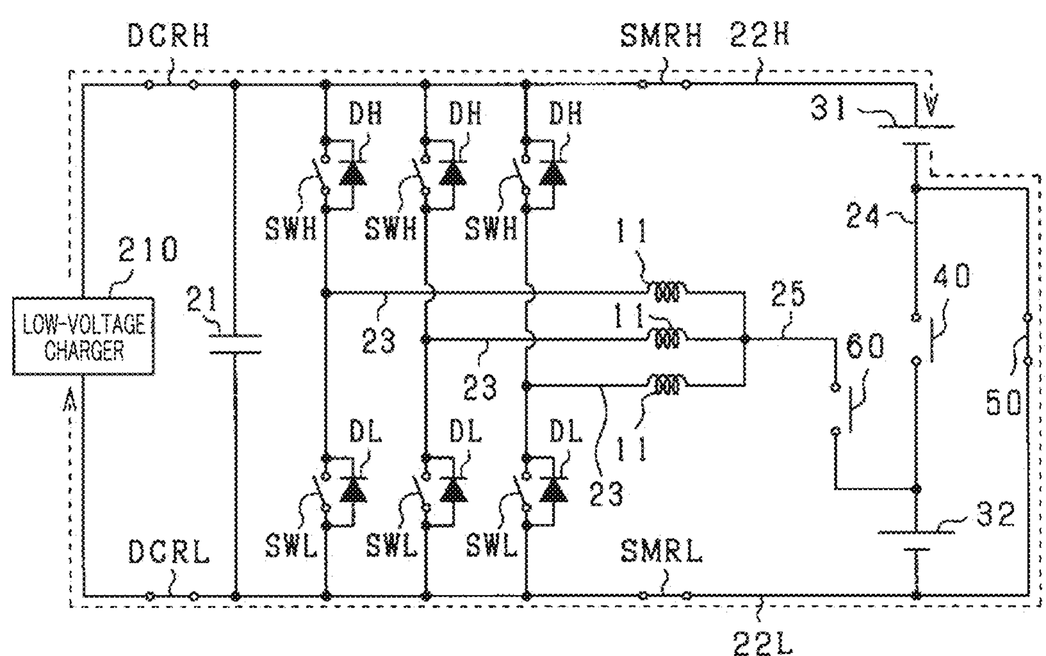
FIG. 3 is a circuit diagram illustrating how the switches are operated in a low-voltage charging mode I according to the first embodiment.

First, the following describes the low-voltage charging mode I with reference to FIG. 3.

In the low-voltage charging mode I, the control apparatus 100 turns off or maintains in the off state the inter-battery switch 40, the motor-side switch 60, and the upper- and lower-arm switches SWH and SWL of the inverter 20, and turns on the negative-terminal bypass switch 50 and the main switches SMRH and SMRL.

This results in, as illustrated in FIG. 3, the first battery 31 selected from the first and second batteries 31 and 32 being only charged by the low-voltage charger 210. That is, the second battery 32 is not charged in the low-voltage charging mode I.

Figure 4:
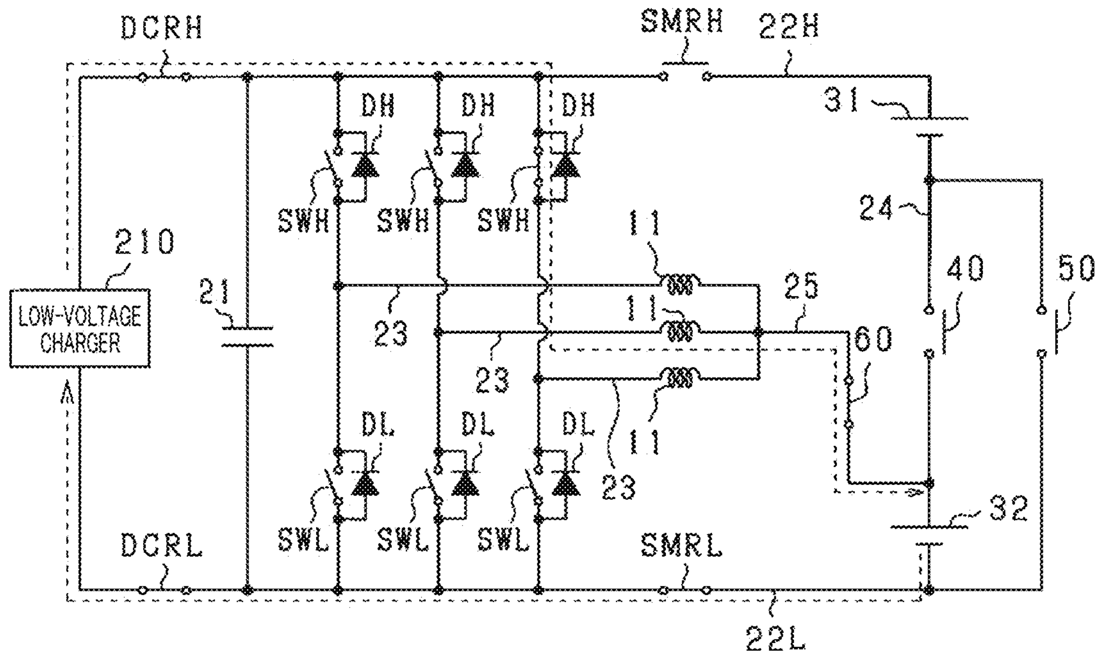
FIG. 4 is a circuit diagram illustrating how the switches are operated in a low-voltage charging mode II according to the first embodiment.

Next, the following describes the low-voltage charging mode II with reference to FIG. 4.

In the low-voltage charging mode II, the control apparatus 100 turns off or maintains in the off state the inter-battery switch 40, the high-side main switch SMRH, and the lower-arm switches SWL of the inverter 20, and turns on the negative-terminal bypass switch 50, the motor-side switch 60, the low-side main switch SMRL, and the upper-arm switch SWH of at least one phase of the inverter 20.

This results in, as illustrated in FIG. 4, the second battery 32 selected from the first and second batteries 31 and 32 being only charged by the low-voltage charger 210. In the low-voltage charging mode II, a charging current supplied from the low-voltage charger 210 flows through the upper-arm switch SWH of the at least one phase of the inverter 20, the conductor 23, the armature winding 11 of the at least one phase, and the motor-side electrical path 25. That is, the first battery 31 is not charged in the low-voltage charging mode II.

Figure 5:
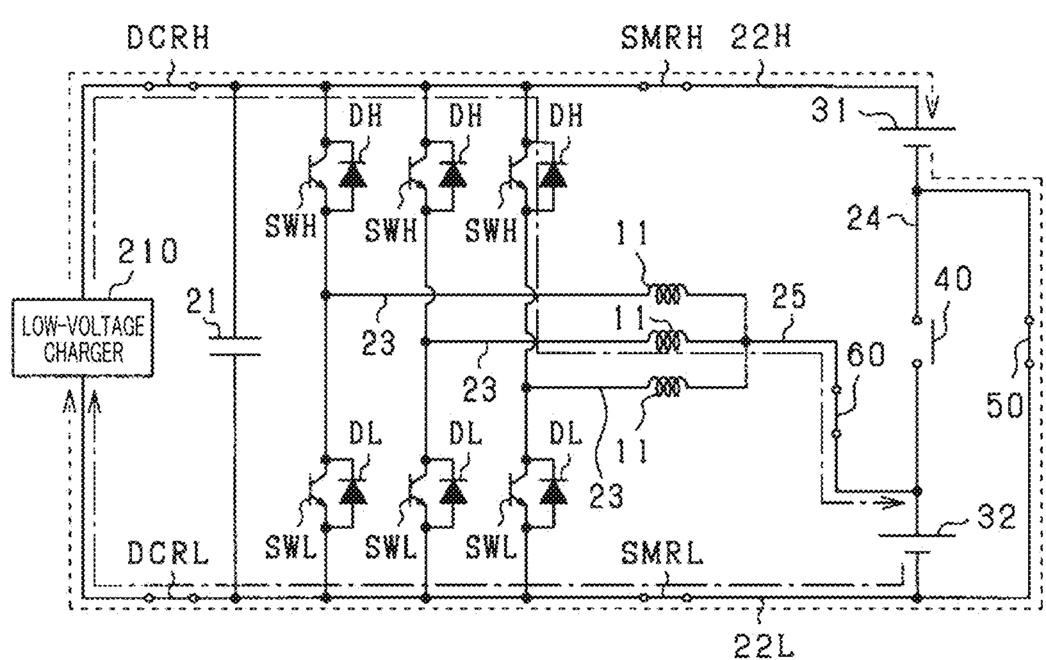
FIG. 5 is a circuit diagram illustrating how the switches are operated in a low-voltage charging mode III according to the first embodiment.

Next, the following describes the low-voltage charging mode III with reference to FIG. 5.

In the low-voltage charging mode III, the control apparatus 100 turns off or maintains in the off state the inter-battery switch 40, and turns on the negative-terminal bypass switch 50, the motor-side switch 60, and the main switches SMRH and SMRL.

In the low-voltage charging mode III, the control apparatus 100 enables adjustment of charging power for individually each of the first and second batteries 31 and 32 in accordance with the measurements of the first and second current sensors 73 and 74 and the measurements of the first and second voltage sensors 71 and 72.

Specifically, while a charging current is supplied from the low-voltage charger 210, the control apparatus 100 alternately turns on the upper- and lower-arm switches SWH and SWL of at least one phase of the inverter 20 or repeatedly turns on and off the upper-arm switch SWH of at least one phase of the inverter 20 while maintaining in the off state the lower-arm switch SWL of the at least one phase of the inverter 20, making it possible to perform this adjustment of the charging power for individually each of the first and second batteries 31 and 32.

More specifically, the control apparatus 100 is configured to adjust a duty factor, which is defined as a ratio Ton/Tsw of an on period Ton of the upper-arm switch SWH to each switching period Tsw of the upper-arm switch SWH, to accordingly adjust the charging power for individually each of the first and second batteries 31 and 32. That is, both the first and second batteries 31 and 32 can be charged in the low-voltage charging mode III.

Let us consider a case where charging of at least one of the first and second batteries 31 and 32 is carried out in the low-voltage charging mode while the motor-side switch 60 is in the on state.

In this case, the terminal voltage across the second battery 32, which is excessively higher than the terminal voltage across the first battery 31, may cause a large amount of current to flow into the first battery 31 from the second battery 32 through the motor-side electrical path 25, at least one of the armature windings 11, the upper-arm diode DH connected in antiparallel to at least one upper-arm switch SWH, and the high-side electrical path 22H. This may result in the reliability of the power conversion apparatus and/or each of the first and second batteries 31 and 32 decreasing. om this viewpoint, for preventing the occurrence of a phenomenon of current-flow from the second battery 32 into the first battery 31 through the motor 10 and the inverter 20 and/or reducing the amount of current flowing from the second battery 32 into the first battery 31 even if the phenomenon occurs, the control apparatus 100 is configured to execute a charging routine illustrated in FIG. 6 in the low-voltage charging mode. The control apparatus 100 is for example programmed to execute the charging routine every predetermined control cycle in, for example a situation where the vehicle CA is stopped, i.e., parked.

When starting the charging routine, the control apparatus 100 determines that the start timing corresponds to the start time of a charging control period, and starts charging of at least one of the first and second batteries 31 and 32 in the low-voltage charging mode in step S10.

Next, the control apparatus 100 determines whether an absolute difference between the terminal voltage across the first battery 31, which will be referred to as a first measurement voltage VA, and the terminal voltage across the second battery 32, which will be referred to as a second measurement voltage VB, is smaller than or equal to a predetermined determination threshold ΔVjde in step S11. The determination in step S11 is to determine whether there is a situation where a current flowing from the second battery 32 to the first battery 31 is likely to be higher.

A rush current between the first and second batteries 31 and 32 is defined based on a relationship between the impedance existing on the current paths between the first and second batteries 31 and 32 and an absolute voltage difference between the first and second batteries 31 and 32. The impedance on the current path between the first and second batteries 31 and 32 is comprised of, for example, the impedance of each of the first and second batteries 31 and 32, the impedance of the inverter 20, the impedance of each armature winding 11, and the impedance of each diode of the inverter 20 in its forward direction.

The determination threshold ΔVjde can be preferably set to a value of the absolute voltage difference between the first and second batteries 31 and 32; the value of the absolute voltage difference enables the rush current, which is defined between a peak current value and a steady-state current value between the first and second batteries 31 and 32, to be lower than or equal to a corresponding allowable level. The allowable level represents the maximum value of a current between the first and second batteries 31 and 32, which can be endured by components on the current paths between the first and second batteries 31 and 32.

The determination threshold ΔVjde is set to be smaller than the rated voltage of each of the first and second batteries 31 and 32. For example, the determination threshold ΔVjde is set to be smaller than or equal to (i) one-tenth, (ii) one-twentieth, (iii) one-fiftieth of, or (iv) one-hundredth of the smaller one of the rated voltage of the first battery 31 and the rated voltage of the second voltage 32.

In response to determination that the absolute difference between the first measurement voltage VA and the second measurement voltage VB is smaller than or equal to the predetermined determination threshold ΔVjde (YES in step S11), the charging routine proceeds to step S12.

In step S12, the control apparatus 100 performs the operations in the low-voltage charging mode III illustrated in FIG. 5 set forth above to maintain (i) the first measurement voltage VA being higher than or equal to the second measurement voltage VB, which is expressed by VA≥VB, and (ii) the absolute difference between the first and second measurement voltages VA and VB being smaller than or equal to the determination threshold ΔVjde, which is expressed by |VA−VB|≤ΔVjde. The operations in step S12 correspond to a voltage adjustment task Next, the control apparatus 100 determines whether the present timing following the voltage adjustment task in step S12 corresponds to one of the following first to fifth specific timings (A) to (E) in step S13.

The first specific timing (A) represents the timing at which power $W_{out}$ charged in the first battery 31 based on the charging power outputted from the low-voltage charger 210 becomes higher than allowable charging power $W_{in}$.

The allowable charging power $W_{in}$ for any battery represents a maximum level of the charging power for the battery as long as the reliability of the battery is maintained without decreasing. The higher the state of charge (SOC) of the first battery 31 as the charging of the first battery 31 progresses, the lower the allowable charging power $W_{in}$ for the first battery 31. For this reason, the progression of charging of the first battery 31 results in the timing, i.e., the first specific timing (A) appearing. The first specific timing (A) represents the timing at which the power $W_{out}$ to be charged in the first battery 31 based on the charging power outputted from the low-voltage charger 210 exceeds the allowable charging power $W_{in}$ for the first battery 31. That is, the operation in step S13 of the charging routine is programmed to proceed to step S17 when the first specific timing (A) arrives, making it possible to efficiently use first redundant power included in the charging power outputted from the low-voltage charger 21 for charging of the second battery 32.

The second specific timing (B) represents the timing at which a constant-current mode CC of the low-voltage charger 210 is switched to a constant-voltage mode CV. The low-voltage charger 210, which operates in the constant-current mode CC, is configured to output the charging current having a constant value. The low-voltage charger 210, which operates in the constant-voltage mode CV, is configured to output the charging voltage having a constant value.

Power required to charge any battery is higher in the constant-current mode CC than that in the constant-voltage mode CV. For this reason, when the constant-current mode CC of the low-voltage charger 21 is switched to the constant-voltage mode CV, second redundant power included in the charging power outputted from the low-voltage charger 21 can be allocated; this redundant power can be efficiently used to charge the second battery 32. The control apparatus 100 can be configured to determine that the constant-current mode of the low-voltage charger 21 is switched to the constant-voltage mode when the first measurement voltage VA becomes higher than or equal to a predetermined voltage.

The third specific timing (C) represents the timing at which the constant-current mode CC of the low-voltage charger 21 is switched to a constant-power mode CP. The low-voltage charger 210, which operates in the constant-power mode CP, is configured to output the charging power having a constant level.

Power required to charge any battery is higher in the constant-current mode CC than that in the constant-power mode CP. For this reason, when the constant-current mode CC of the low-voltage charger 21 is switched to the constant-power mode CP, third redundant power included in the charging power outputted from the low-voltage charger 21 can be allocated; this redundant power can be efficiently used to charge the second battery 32.

The fourth specific timing (D) represents the timing defined to be earlier by predetermined time than an end time of the charging control period.

The fourth specific timing (D) is used for a case where the charging control period is set to a previously fixed period, such as 20 minutes. For example, if the charging control period is set to 20 minutes and the previously fixed time is set to 5 minutes, the fourth timing (D) is set to the timing at which 15 minutes has elapsed since the start time of the charging control period.

The fourth specific timing (D) is used to contribute to balance, even if charging of the first and second batteries 31 and 32 is terminated without the first and second batteries 31 and 32 being fully charged, (i) the remaining capacity of the first battery 31 and that of the second battery 32, (ii) the SOC of the first battery 31 and that of the second battery 32, and/or (iii) the first measurement voltage across the first battery 31 and that across the second battery 32. The remaining capacity of any battery is defined as the capacity of the battery as a function of the capacity of the battery being new, a degree of deterioration of the battery, and/or the SOC of the battery.

For example, the remaining capacity of any battery can be represented as the following formulas:

$$RC\ [\mathrm{Ah}] = FC\ [\mathrm{Ah}] \times SOC\ [\%] = NC\ [\mathrm{Ah}] \times SOH\ [\%] \times SOC\ [\%]$$

where:

RC represents the remaining capacity of the battery;

FC represents the full charge capacity of the battery;

NC represents the capacity of the battery being new; and

SOH represents the degree of deterioration of the battery.

The fourth specific timing (D) represents the timing defined to be earlier by predetermined time than an end time of the charging control period.

The fifth specific timing (E) represents the timing at which the SOC of the first battery 31 reaches a particular percentage that is defined by subtracting a predetermined percentage ΔSOC from a target percentage at the end time of the charging control period. The target percentage of each of the first and second batteries 31 and 32 can be set to, for example, 80 percent. For example, the SOC of the first battery 31 can be calculated based on the measurements of the first voltage sensor 71 and the first current sensor 73.

In response to determination that the present timing does not correspond to any of the following first to fifth specific timings (A) to (E) (NO in step S13), the charging routine proceeds to step S11. Otherwise, in response to determination that the present timing corresponds to one of the first to fifth specific timings (A) to (E) (YES in step S13), the charging routine proceeds to step S17.

In step S17, the control apparatus 100 performs the voltage adjustment task after a remaining period of the charging control period after the one of the first to fifth specific timings (A) to (E).

Specifically, the control apparatus 100 performs the operations in the low-voltage charging mode III to (I) Maintain both the first measurement voltage VA being higher than or equal to the second measurement voltage VB, which is expressed by VA≥VB and the absolute difference between the first and second measurement voltages VA and VB being smaller than or equal to the determination threshold ΔVjde, which is expressed by |VA−VB|≤ΔVjde (II) Cause the absolute difference between the first and second measurement voltages VA and VB at the end time of the charging control period to be smaller than that at the one of the first to fifth specific timings (A) to (E)

(III) Cause the charging current IB for the second battery 32 to be higher than the charging current IA for the first battery 31

The operations in step S17 cause the absolute difference between the first and second measurement voltages VA and VB to gradually decrease. This results in a balance between (i) the remaining capacity of the first battery 31 and that of the second battery 32, a balance between (ii) the SOC of the first battery 31 and that of the second battery 32, and/or a balance between (iii) the first measurement voltage across the first battery 31 and that across the second battery 32.

Next, the control apparatus 100 determines whether the present timing following the voltage adjustment task in step S17 has reached the end time of the charging control period in step S18, and repeats the operations in steps S17 and S18 until the determination in step S18 is affirmative.

At the start time of the charging control period, i.e., at the charging start timing, the first measurement voltage VA across the first battery 31 may be significantly different from the second measurement voltage VB across the second battery 32. In this case, the determination in step S11 is negative.

In response to the negative determination in step S11, the control apparatus 100 is programmed to perform, prior to the voltage charging task in step S12, a preliminary charging task in steps S14 to S16 to reduce the absolute difference between the first measurement voltage VA across the first battery 31 and the second measurement voltage VB across the second battery 32.

Specifically, the control apparatus 100 determines whether the second measurement voltage VB is higher than the first measurement voltage VA in step S14.

In response to determination that the second measurement voltage VB is higher than the first measurement voltage VA (YES in step S14), the charging routine proceeds to step S15. In other words, in response to determination that the first voltage VA is lower than a value (VB−ΔVjde), which is obtained by subtracting the determination threshold ΔVjde from the second measurement voltage VB, the charging routine proceeds to step S15.

In step S15, the control apparatus 100 performs the operations in the low-voltage charging mode I that charges only the first battery 31 through the low-voltage charger 210 to cause the absolute difference |VA−VB| between the first and second measurement voltages VA and VB to be smaller than or equal to the determination threshold ΔVjde (see FIG. 3). Thereafter, the charging routine proceeds to step S13. In step S15, the control apparatus 100 can perform the operations in the low-voltage charging mode I to cause the first measurement voltage VA to be higher than or equal to the second measurement voltage VB.

The operation in step S15 makes it possible to eliminate a great difference between the SOC of the first battery 31 and that of the second battery 32 earlier, and reliably prevent a current from flowing from the second battery 32 to the first battery 31 through the armature windings 11 and the inverter 20.

Otherwise, in response to determination that the second measurement voltage VB is lower than the first measurement voltage VA (NO in step S14), the charging routine proceeds to step S16.

In step S16, the control apparatus 100 performs the operations in the low-voltage charging mode II that charges only the second battery 32 through the low-voltage charger 210 to cause the absolute difference |VA−VB| between the first and second measurement voltages VA and VB to be smaller than or equal to the determination threshold ΔVjde (see FIG. 4). Thereafter, the charging routine proceeds to step S13. In step S16, the control apparatus 100 can perform the operations in the low-voltage charging mode II to cause the first measurement voltage VA to be higher than or equal to the second measurement voltage VB.

The operation in step S16 makes it possible to eliminate a great difference between the SOC of the first battery 31 and that of the second battery 32 earlier.

In step S16, the control apparatus 100 can be configured to perform the operations in the low-voltage mode III in place of the operations in the low-voltage mode II. In more detail, the control apparatus 100 can be configured to perform the operations in the low-voltage charging mode III to cause the charging current supplied from the low-voltage charger 210 to the second battery 32 to be higher than the charging current supplied from the low-voltage charger 210 to the first battery 31, and the absolute difference between the first and second measurement voltages VA and VB to be smaller than or equal to the determination threshold ΔVjde. This makes shorter a charging period for the first and second batteries 31 and 32 while eliminating the absolute difference between the first and second measurement voltages VA and VB.

Figure 7:
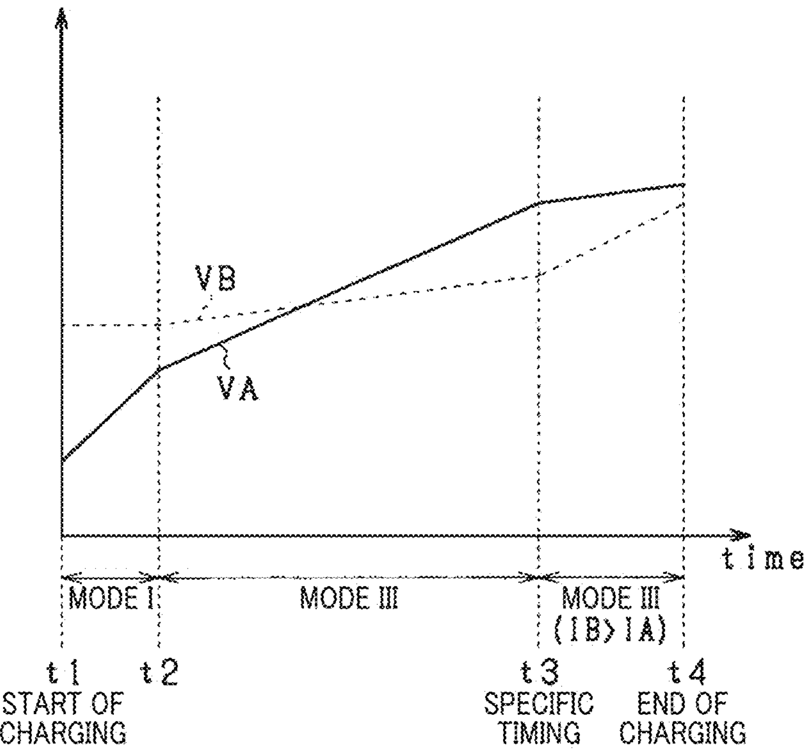
FIG. 7 is a timing chart illustrating a first specific example of the charging routine.
Figure 8:
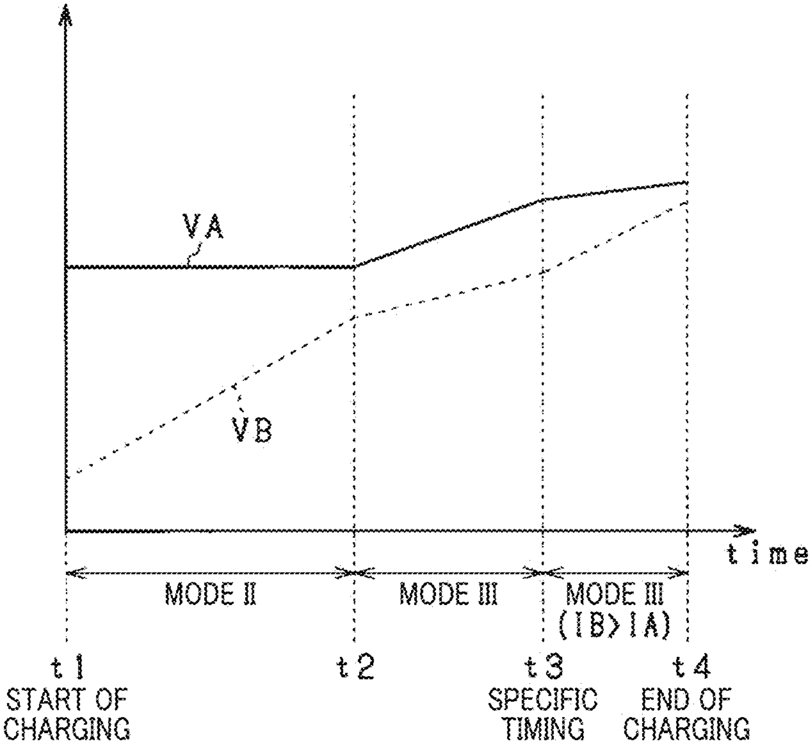
FIG. 8 is a timing chart illustrating a second specific example of the charging routine.
Figure 9:
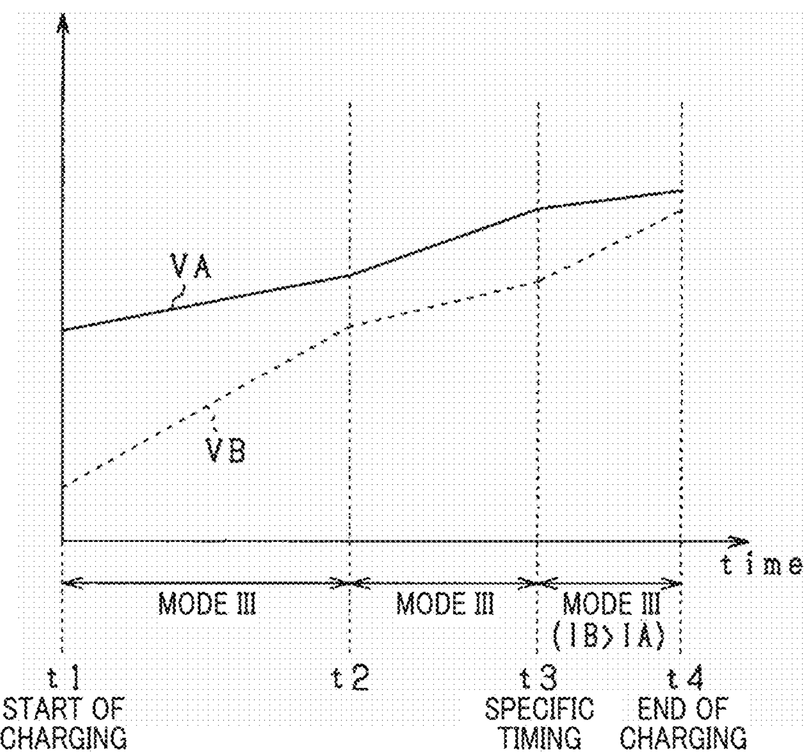
FIG. 9 is a timing chart illustrating a third specific example of the charging routine.

Next, the following describes first to third specific examples of the charging routines using FIGS. 7 to 9, respectively.

First, the following describes the first specific example of the charging routine illustrated in FIG. 7.

The control apparatus 100 starts the charging routine at time t1 of FIG. 7. At the time t1 of starting the charging routine, the control apparatus 100 determines that the absolute difference between the first measurement voltage VA across the first battery 31 and the second measurement voltage VB across the second battery 32 is smaller than or equal to the predetermined determination threshold ΔVjde. Additionally, the control apparatus 100 determines that the first measurement voltage VA is lower than the second measurement voltage VB.

In response to the results of the determinations, the control apparatus 100 performs the operations in the low-battery charging mode I in step S15. This results in the first battery 31 being charged, so that the first measurement voltage VA starts to rise. In contrast, because the second battery 32 is not charged, the second voltage VB is maintained constant.

At time t2 of FIG. 7, the control apparatus 100 determines that the absolute difference between the first and second measurement voltages VA and VB is smaller than or equal to the determination threshold ΔVjde. In response to the result of the determination, the control apparatus 100 performs the operations in the low-battery charging mode III.

Next, the control apparatus 100 determines that one of the following first to fifth specific timings (A) to (E) has arrived at time t3 of FIG. 7. In response to the result of the determination, the control apparatus 100 performs the operations in the low-battery charging mode III in step S17 until the end time of the charging control period; the end time is illustrated as time t4 of FIG. 7. In the low-battery charging mode III, because the charging current IB for the second battery 32 is higher than the charging current IA for the first battery 31, the rate of rise in the second measurement voltage VB is faster than the rate of rise in the first measurement voltage VA. This results in the absolute difference between the first and second measurement voltages VA and VB being smaller as it gets closer to the time t4 of FIG. 7. At the time t4, the absolute difference between the first and second measurement voltages VA and VB is smaller than that at the time t3 of FIG. 7, for example, smaller than the determination threshold ΔVjde.

Next, the following describes the second specific example of the charging routine illustrated in FIG. 8.

The control apparatus 100 starts the charging routine at time t1 of FIG. 8. At the time t1 of starting the charging routine, the control apparatus 100 determines that the absolute difference between the first measurement voltage VA across the first battery 31 and the second measurement voltage VB across the second battery 32 is higher than the predetermined determination threshold ΔVjde. Additionally, the control apparatus 100 determines that the second measurement voltage VB is lower than the first measurement voltage VA.

In response to the results of the determinations, the control apparatus 100 performs the operations in the low-battery charging mode II in step S16. This results in the second battery 32 being charged, so that the second measurement voltage VB starts to rise.

At time t2 of FIG. 8, the control apparatus 100 determines that the absolute difference between the first and second measurement voltages VA and VB is smaller than or equal to the determination threshold ΔVjde. In response to the result of the determination, the control apparatus 100 performs the operations in the low-battery charging mode III.

Next, the control apparatus 100 determines that one of the following first to fifth specific timings (A) to (E) has arrived at time t3 of FIG. 8. In response to the result of the determination, the control apparatus 100 performs the operations in the low-battery charging mode III in step S17 until the end time of the charging control period; the end time is illustrated as time t4 of FIG. 8.

Additionally, the following describes the third specific example of the charging routine illustrated in FIG. 9. The third specific example of the charging routine illustrated in FIG. 9 shows a case where the control apparatus 100 performs, in step S16, the operations in the low-battery charging mode III in place of the operations in the low-battery charging mode II to cause (i) the charging current for the second battery 32 to be higher than the charging current for the first battery 31, and (ii) the absolute difference between the first and second measurement voltages VA and VB to be smaller than or equal to the determination threshold ΔVjde.

The control apparatus 100 starts the charging routine at time t1 of FIG. 9. At the time t1 of starting the charging routine, the control apparatus 100 determines that the absolute difference between the first measurement voltage VA across the first battery 31 and the second measurement voltage VB across the second battery 32 is higher than the predetermined determination threshold ΔVjde. Additionally, the control apparatus 100 determines that the second measurement voltage VB is lower than the first measurement voltage VA.

In response to the results of the determinations, the control apparatus 100 performs the operations in the low-battery charging mode III in step S16. This results in the first and second batteries 31 and 32 being charged, so that each of the first and second measurement voltages VA and VB starts to rise. Because the charging current for the second battery 32 is higher than that for the first battery 31, the rate of rise in the second measurement voltage VB is faster than the rate of rise in the first measurement voltage VA.

At time t2 of FIG. 9, the control apparatus 100 determines that the absolute difference between the first and second measurement voltages VA and VB is smaller than or equal to the determination threshold ΔVjde. In response to the result of the determination, the control apparatus 100 performs the operations in the low-battery charging mode III.

Next, the control apparatus 100 determines that one of the following first to fifth specific timings (A) to (E) has arrived at time t3 of FIG. 9. In response to the result of the determination, the control apparatus 100 performs the operations in the low-battery charging mode III in step S17 until the end time of the charging control period; the end time is illustrated as time t4 of FIG. 9.

The first embodiment described above therefore makes it possible to prevent the occurrence of a phenomenon of current-flow from the second battery 32 into the first battery 31 through the motor 10 and the inverter 20 and/or reduce the amount of current flowing from the second battery 32 into the first battery 31 even if the phenomenon occurs.

Additionally, the first embodiment causes the absolute difference between the first and second measurement voltages VA and VB to be smaller than or equal to the determination threshold ΔVjde through the use of the motor 10 and the inverter 20. This therefore results in no need of providing additional electrical components, such as a DC to DC converter, in the power conversion apparatus in order to prevent the occurrence of a phenomenon of current-flow from the second battery 32 into the first battery 31 through the motor 10 and the inverter 20 and/or reduce the amount of current flowing from the second battery 32 into the first battery 31 even if the phenomenon occurs. This therefore makes it possible to offer the power conversion apparatus with a simpler configuration.

Modification of First Embodiment

In each of step S12, S15, S16, and S17 in FIG. 6, the control apparatus 100 can permit the second measurement voltage VB being higher than the first measurement voltage VA, which is expressed by VA<VB as long as the condition that the absolute difference between the first and second measurement voltages VA and VB is smaller than or equal to the determination threshold ΔVjde, which is expressed by $|VA-VB| \leq \Delta Vjde$, is maintained.

Second Embodiment

The following describes the second embodiment with reference to corresponding drawings. In particular, the following describes mainly different points of the second embodiment as compared with the first embodiment.

Figure 10:
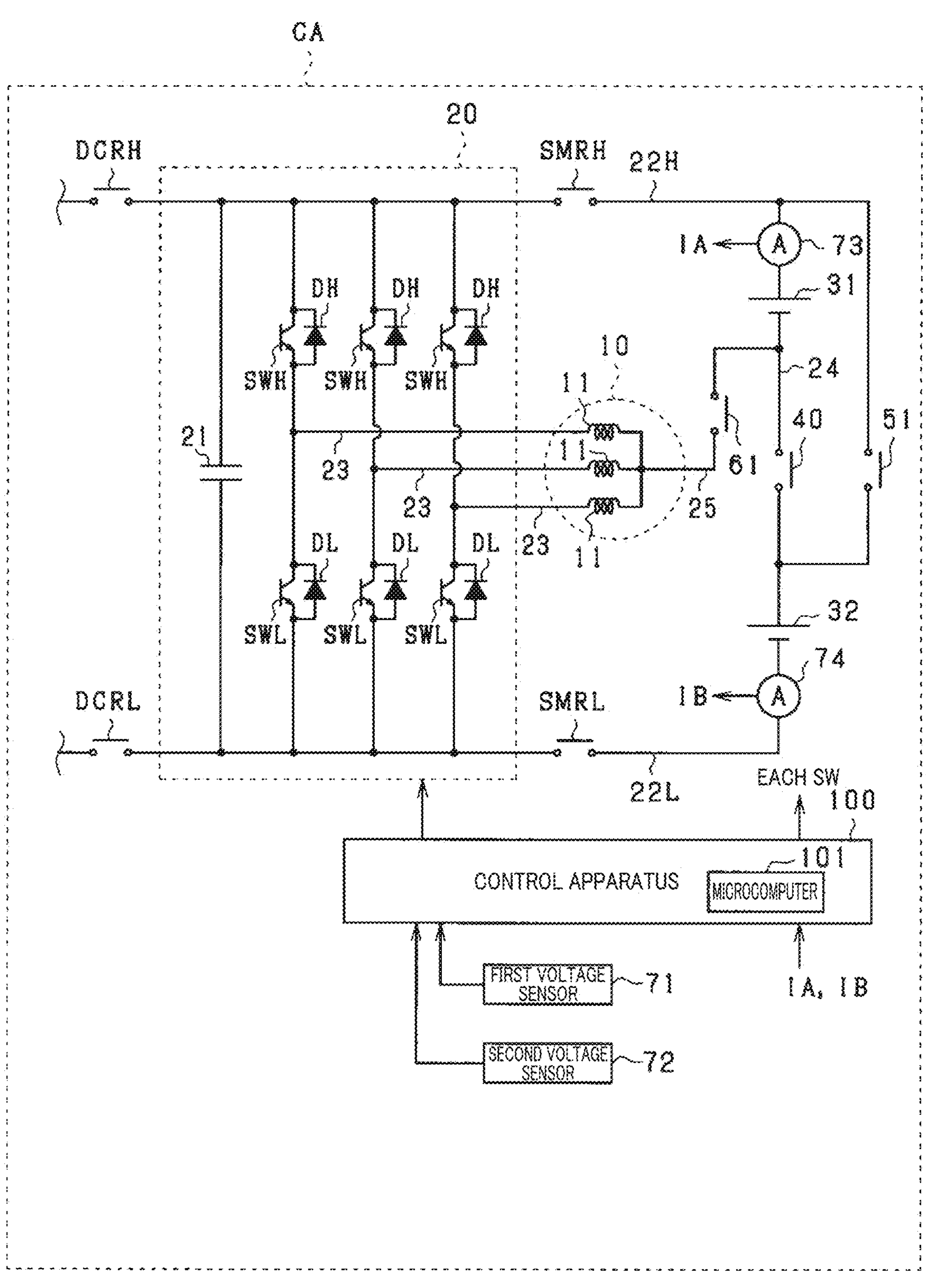
FIG. 10 is an overall structural diagram of a vehicular system according to the second embodiment.

A power conversion apparatus according to the second embodiment includes, as illustrated in FIG. 10, includes a positive-terminal bypass switch 51 without including the negative-terminal bypass switch 50 illustrated in FIG. 1. Additionally, a motor-side electrical path 25 of the second embodiment is arranged to connect between any point on the first section of the inter-battery electrical path 24 and neutral point of the armature windings 11; the first section of the inter-battery electrical path 24 is arranged between the between the inter-battery switch 40 and the negative terminal of the first battery 31. A motor-side switch to which reference character 61 is assigned according to the second embodiment is mounted on the motor-side electrical path 25.

Next, the following describes the high-voltage charging mode.

In the high-voltage charging mode, the control apparatus 100 turns on the inter-battery switch 40 and the main switches SMRH and SMRL and turns off or maintains in the off state the positive-terminal bypass switch 51, the motor-side switch 61, and the upper- and lower-arm switches SWH and SWL to cause the first and second batteries 31 and 32 to be connected in series to the high-voltage charger 200.

Figure 11:
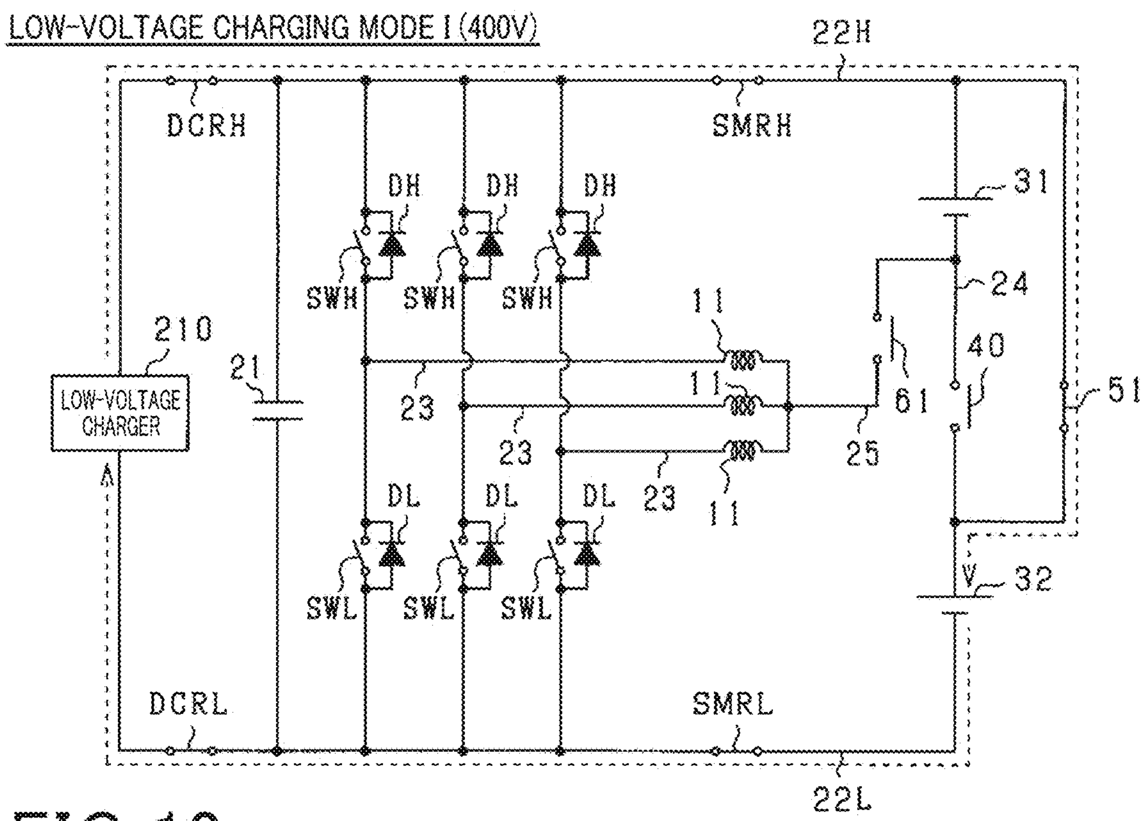
FIG. 11 is a circuit diagram illustrating how the switches are operated in the low-voltage charging mode I according to the second embodiment.
Figure 12:
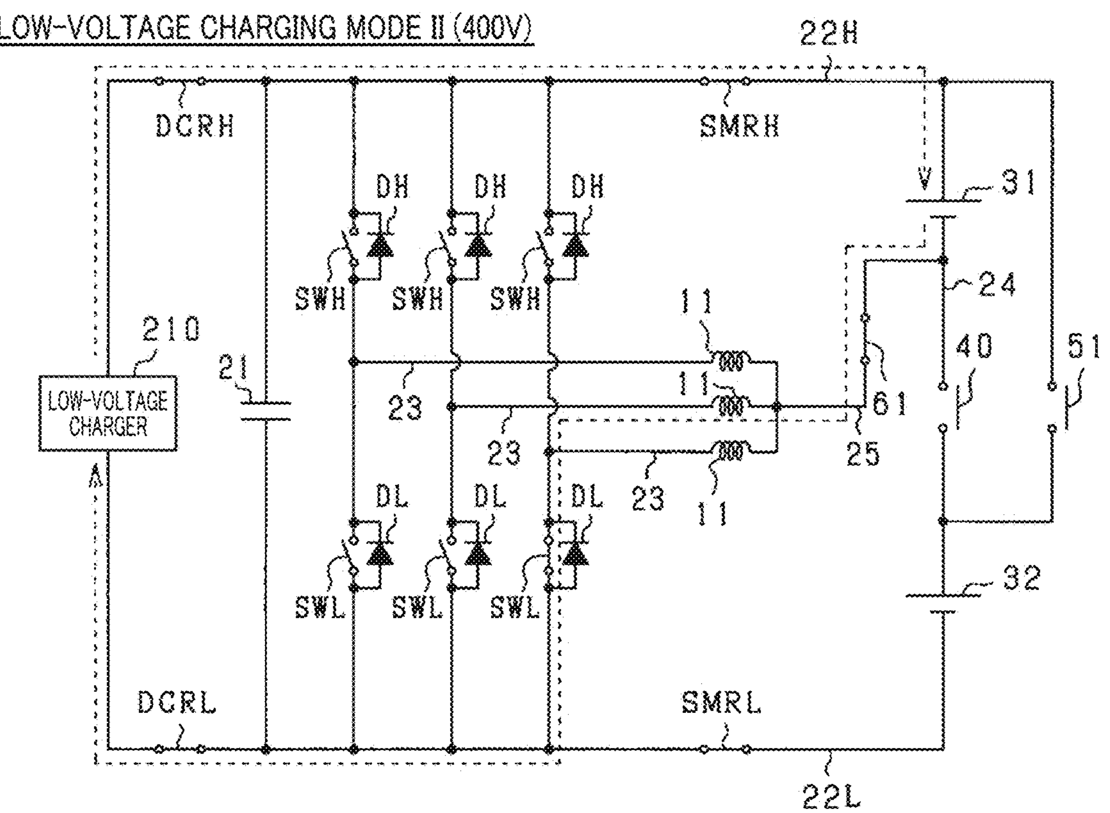
FIG. 12 is a circuit diagram illustrating how the switches are operated in a low-voltage charging mode II according to the second embodiment.
Figure 13:
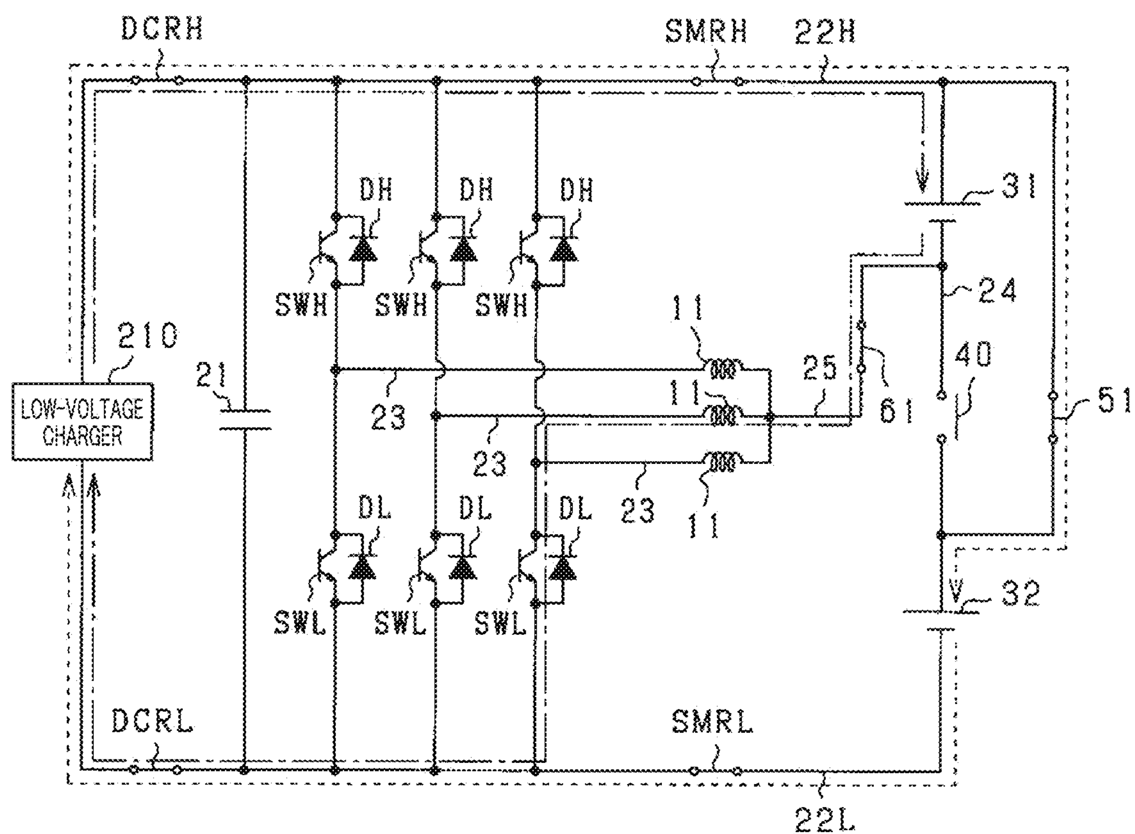
FIG. 13 is a circuit diagram illustrating how the switches are operated in a low-voltage charging mode III according to the second embodiment.

Next, the following describes, as the low-voltage charging mode, the low-voltage charging mode I, the low-voltage charging mode II, and the low-voltage charging mode III with reference to FIGS. 11 to 13.

First, the following describes the low-voltage charging mode I with reference to FIG. 11.

In the low-voltage charging mode I, the control apparatus 100 turns off or maintains in the off state the inter-battery switch 40, the motor-side switch 61, and the upper- and lower-arm switches SWH and SWL of the inverter 20, and turns on the positive-terminal bypass switch 51 and the main switches SMRH and SMRL.

This results in, as illustrated in FIG. 11, the second battery 32 selected from the first and second batteries 31 and 32 being only charged by the low-voltage charger 210. That is, the first battery 31 is not charged in the low-voltage charging mode I.

Next, the following describes the low-voltage charging mode II with reference to FIG. 12.

In the low-voltage charging mode II, the control apparatus 100 turns off or maintains in the off state the inter-battery switch 40 and the upper-arm switches SWH of the inverter 20, and turns on the positive-terminal bypass switch 51, the motor-side switch 61, the high-side main switch SMRH, and the lower-arm switch SWL of at least one phase of the inverter 20.

This results in, as illustrated in FIG. 12, the first battery 31 selected from the first and second batteries 31 and 32 being only charged by the low-voltage charger 210. In the low-voltage charging mode II, a charging current supplied from the low-voltage charger 210 flows through the motor-side electrical path 25, the armature winding 11 of the at least one phase, the conductor 23, and the lower-arm switch SWL of the at least one phase of the inverter 20. That is, the second battery 32 is not charged in the low-voltage charging mode II. In the low-voltage charging mode II, the low-side main switch SMRL can be in one of the on state and the off state.

Next, the following describes the low-voltage charging mode III with reference to FIG. 13.

In the low-voltage charging mode III, the control apparatus 100 turns off or maintains in the off state the inter-battery switch 40, and turns on the positive-terminal bypass switch 51, the motor-side switch 61, and the main switches SMRH and SMRL.

In the low-voltage charging mode III, the control apparatus 100 enables adjustment of charging power for individually each of the first and second batteries 31 and 32 in accordance with the measurements of the first and second current sensors 73 and 74 and the measurements of the first and second voltage sensors 71 and 72.

Specifically, while a charging current is supplied from the low-voltage charger 210, the control apparatus 100 alternately turns on the upper- and lower-arm switches SWH and SWL of at least one phase of the inverter 20 or repeatedly turns on and off the upper-arm switch SWH of at least one phase of the inverter 20 while maintaining in the off state the lower-arm switch SWL of the at least one phase of the inverter 20, making it possible to perform this adjustment of the charging power for individually each of the first and second batteries 31 and 32.

More specifically, the control apparatus 100 is configured to adjust the duty factor, which is defined as the ratio Ton/Tsw of the on period Ton of the upper-arm switch SWH to each switching period Tsw of the upper-arm switch SWH, to accordingly adjust the charging power for individually each of the first and second batteries 31 and 32. That is, both the first and second batteries 31 and 32 can be charged in the low-voltage charging mode III.

Let us consider a case where charging of at least one of the first and second batteries 31 and 32 is carried out in the low-voltage charging mode while the motor-side switch 61 is in the on state.

In this case, the terminal voltage across the first battery 31, which is excessively higher than the terminal voltage across the second battery 32, may create a closed circuit that includes the first battery 31, the positive-terminal bypass switch 51, the lower-arm diode DL connected in antiparallel to any lower-arm switch SWL, the armature winding 11 corresponding to the lower-arm diode DL, and the motor-side electrical path 25. This may result in a current flowing into the second battery 32 from the first battery 31 through the created closed circuit loop.

From this viewpoint, the control apparatus 100 is configured to execute a charging routine illustrated in FIG. 14 in the low-voltage charging mode. The control apparatus 100 is for example programmed to execute the charging routine every predetermined control cycle in, for example a situation where the vehicle CA is stopped, i.e., parked.

When starting the charging routine, the control apparatus 100 determines that the start timing corresponds to the start time of the charging control period, and starts charging of at least one of the first and second batteries 31 and 32 in the low-voltage charging mode in step S20.

Next, the control apparatus 100 determines whether the absolute difference between the first measurement voltage VA and the second measurement voltage VB is smaller than or equal to the predetermined determination threshold ΔVjde in step S21.

In response to determination that the absolute difference between the first measurement voltage VA and the second measurement voltage VB is smaller than or equal to the predetermined determination threshold ΔVjde (YES in step S21), the charging routine proceeds to step S22.

In step S22, the control apparatus 100 performs the operations in the low-voltage charging mode III illustrated in FIG. 13 to maintain (i) the second measurement voltage VB being higher than or equal to the first measurement voltage VA, which is expressed by VB≥VA, and (ii) the absolute difference between the first and second measurement voltages VA and VB being smaller than or equal to the determination threshold ΔVjde, which is expressed by |VB−VA|≤ΔVjde.

Next, the control apparatus 100 determines whether the present timing following the voltage adjustment task in step S22 corresponds to, for example, one of the first to fifth specific timings (A) to (E) set forth above in step S23.

The first specific timing (A) can be set to the timing at which the power $W_{out}$ to be charged in the second battery 32 based on the charging power outputted from the low-voltage charger 210 exceeds the allowable charging power $W_{in}$ for the second battery 32. The fifth specific timing (E) can be set to the timing at which the SOC of the second battery 32 reaches a predetermined percentage that is defined by subtracting a predetermined percentage from a target percentage at the end time of the charging control period. For example, the SOC of the second battery 32 can be calculated based on the measurements of the second voltage sensor 72 and the second current sensor 74.

In response to determination that the present timing does not correspond to any of the following first to fifth specific timings (A) to (E) (NO in step S23), the charging routine proceeds to step S21. Otherwise, in response to determination that the present timing corresponds to one of the first to fifth specific timings (A) to (E) (YES in step S23), the charging routine proceeds to step S27.

In step S27, the control apparatus 100 performs the voltage adjustment task after a remaining period of the charging control period after the one of the first to fifth specific timings (A) to (E).

Specifically, the control apparatus 100 performs the operations in the low-voltage charging mode III to (I) Maintain both the second measurement voltage VB being higher than or equal to the first measurement voltage VA, which is expressed by VB≥VA and the absolute difference between the first and second measurement voltages VA and VB being smaller than or equal to the determination threshold ΔVjde, which is expressed by |VB−VA|≤ΔVjde (II) Cause the absolute difference between the first and second measurement voltages VA and VB at the end time of the charging control period to be smaller than that at the one of the first to fifth specific timings (A) to (E)

(III) Cause the charging current IA for the first battery 31 to be higher than the charging current IB for the second battery 32

Next, the control apparatus 100 determines whether the present timing following the voltage adjustment task in step S27 has reached the end time of the charging control period in step S28, and repeats the operations in steps S27 and S28 until the determination in step S28 is affirmative.

At the start time of the charging control period, i.e., at the charging start timing, the second measurement voltage VA across the second battery 32 may be significantly different from the first measurement voltage VA across the first battery 31. In this case, the determination in step S21 is negative.

In response to the negative determination in step S21, the control apparatus 100 is programmed to perform, prior to the voltage charging task in step S22, a preliminary charging task in steps S24 to S26 to reduce the absolute difference between the first measurement voltage VA across the first battery 31 and the second measurement voltage VB across the second battery 32.

Specifically, the control apparatus 100 determines whether the first measurement voltage VA is higher than the second measurement voltage VB in step S24.

In response to determination that the first measurement voltage VA is higher than the second measurement voltage VB (YES in step S24), the charging routine proceeds to step S25. In other words, in response to determination that the second voltage VB is lower than a value (VA−ΔVjde), which is obtained by subtracting the determination threshold ΔVjde from the first measurement voltage VA, the charging routine proceeds to step S25.

In step S25, the control apparatus 100 performs the operations in the low-voltage charging mode I that charges only the second battery 32 through the low-voltage charger 210 to cause the absolute difference |VB−VA| between the first and second measurement voltages VA and VB to be smaller than or equal to the determination threshold ΔVjde (see FIG. 11). Thereafter, the charging routine proceeds to step S23. In step S25, the control apparatus 100 can perform the operations in the low-voltage charging mode I to cause the second measurement voltage VB to be higher than or equal to the first measurement voltage VA.

Otherwise, in response to determination that the first measurement voltage VA is lower than the second measurement voltage VB (NO in step S24), the charging routine proceeds to step S26.

In step S26, the control apparatus 100 performs the operations in the low-voltage charging mode II that charges only the first battery 31 through the low-voltage charger 210 to cause the absolute difference |VB−VA| between the first and second measurement voltages VA and VB to be smaller than or equal to the determination threshold ΔVjde (see FIG. 12). Thereafter, the charging routine proceeds to step S23. In step S26, the control apparatus 100 can perform the operations in the low-voltage charging mode II to cause the second measurement voltage VB to be higher than or equal to the first measurement voltage VA.

In step S26, the control apparatus 100 can be configured to perform the operations in the low-voltage mode III in place of the operations in the low-voltage mode II. In more detail, the control apparatus 100 can be configured to perform the operations in the low-voltage charging mode III to cause the charging current supplied from the low-voltage charger 210 to the first battery 31 to be higher than the charging current supplied from the low-voltage charger 210 to the second battery 32, and the absolute difference between the first and second measurement voltages VA and VB to be smaller than or equal to the determination threshold ΔVjde.

The second embodiment described above achieves the same advantageous benefits as those achieved by the first embodiment.

Modifications

The above embodiments can be modified as follows:

In each of steps S22, S25, S26, and S27 in FIG. 14 according to the second embodiment, the control apparatus 100 can permit the first measurement voltage VA being higher than the second measurement voltage VB, which is expressed by VB<VA as long as the condition that the absolute difference between the first and second measurement voltages VA and VB is smaller than or equal to the determination threshold ΔVjde, which is expressed by |VB−VA|≤ΔVjde, is maintained.

The configuration of each of the power conversion apparatuses set forth above can be modified to have any one of the following conditions.

Figure 15:
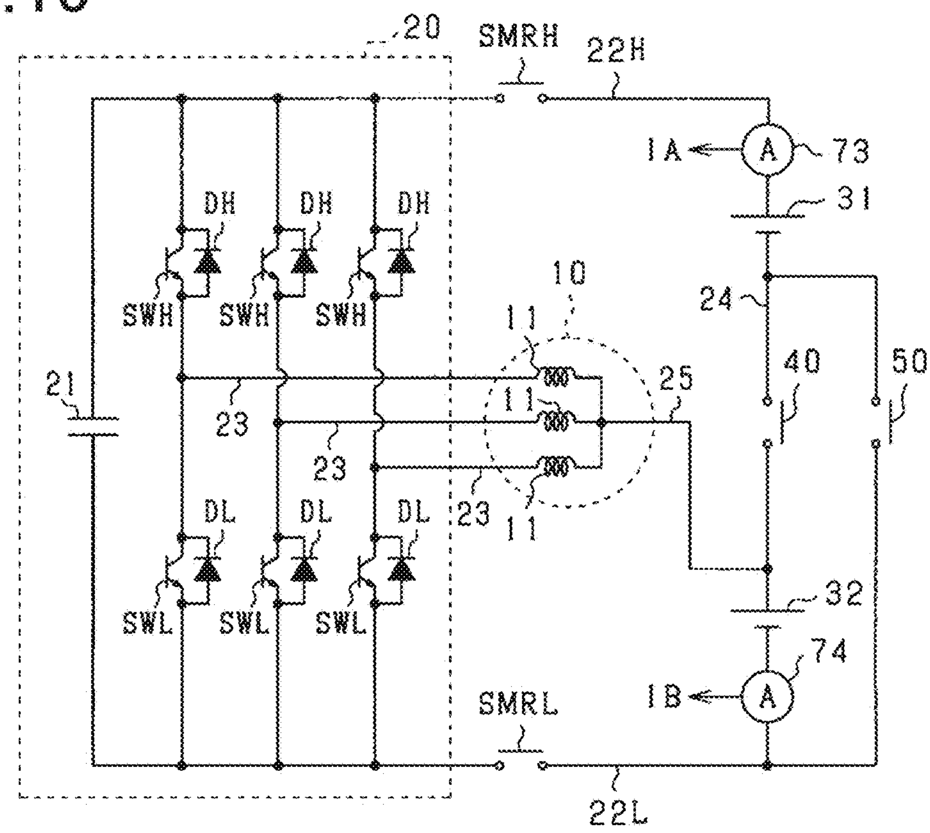
FIG. 15 is an overall structural diagram of a vehicular system according to a modification.

The motor-side switch 60 mounted on the motor-side electrical path 25 illustrated in FIG. 1 can be omitted (see FIG. 15).

Figure 16:
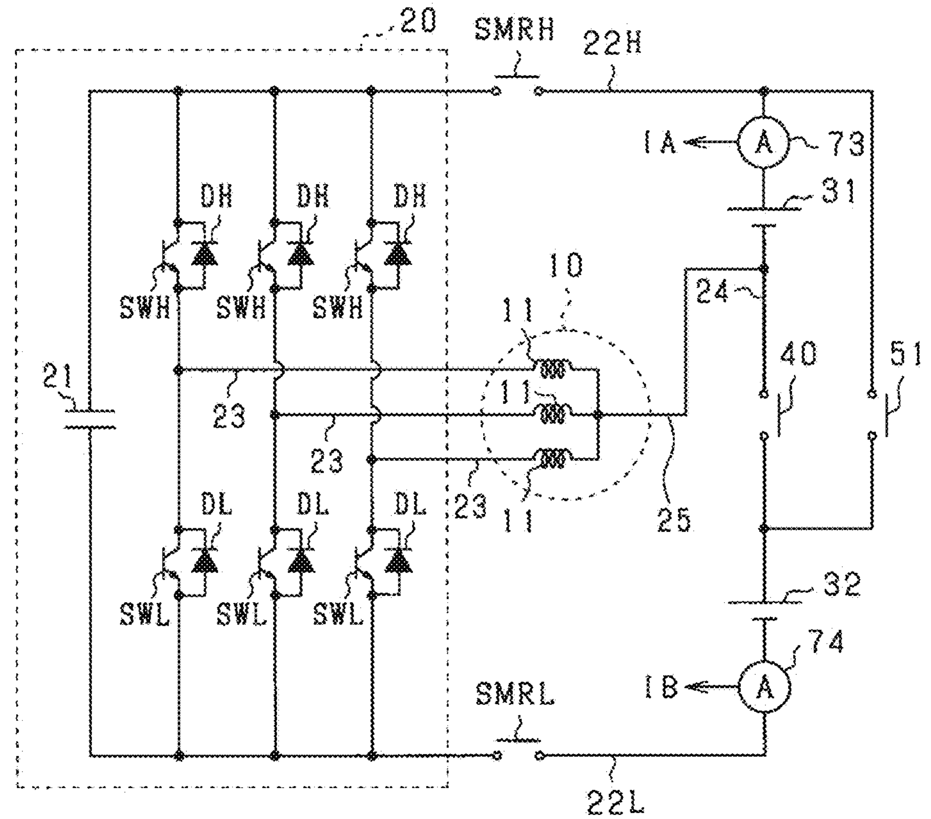
FIG. 16 is an overall structural diagram of a vehicular system according to another modification.

The motor-side switch 61 mounted on the motor-side electrical path 25 illustrated in FIG. 10 can be omitted (see FIG. 16).

Figure 17:
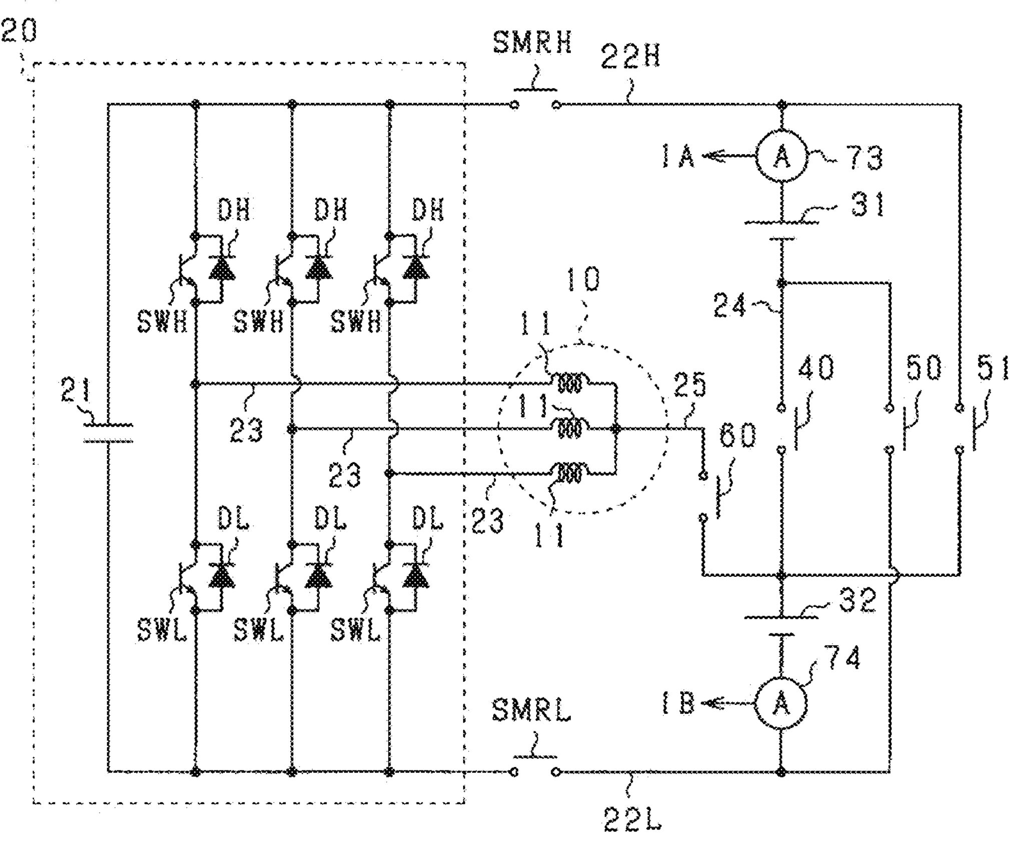
FIG. 17 is an overall structural diagram of a vehicular system according to a further modification.

The positive-terminal bypass switch 51 can be additionally mounted to the configuration illustrated in FIG. 1 (see FIG. 17). In this modification, in each of the high-voltage charging mode and the charging routine illustrated in FIG. 6, the positive-terminal bypass switch 51 should be maintained in the off state.

Figure 18:
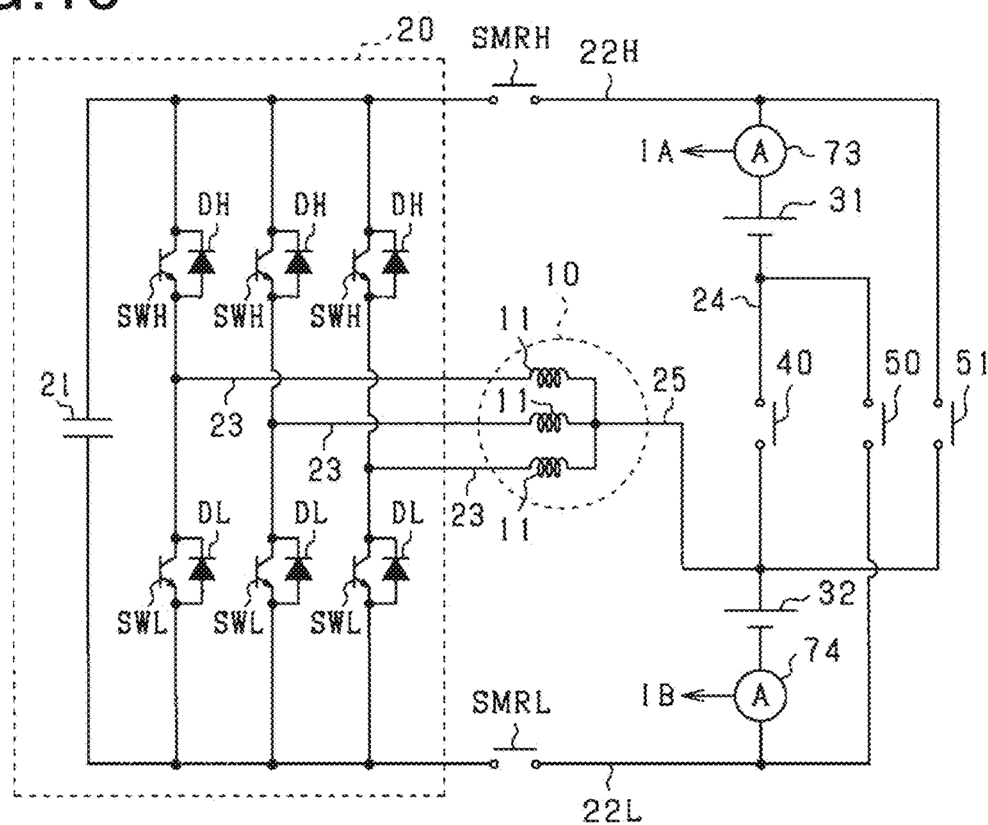
FIG. 18 is an overall structural diagram of a vehicular system according to a still further modification.

The motor-side switch 60 mounted on the motor-side electrical path 25 illustrated in FIG. 17 can be omitted (see FIG. 18).

Figure 19:
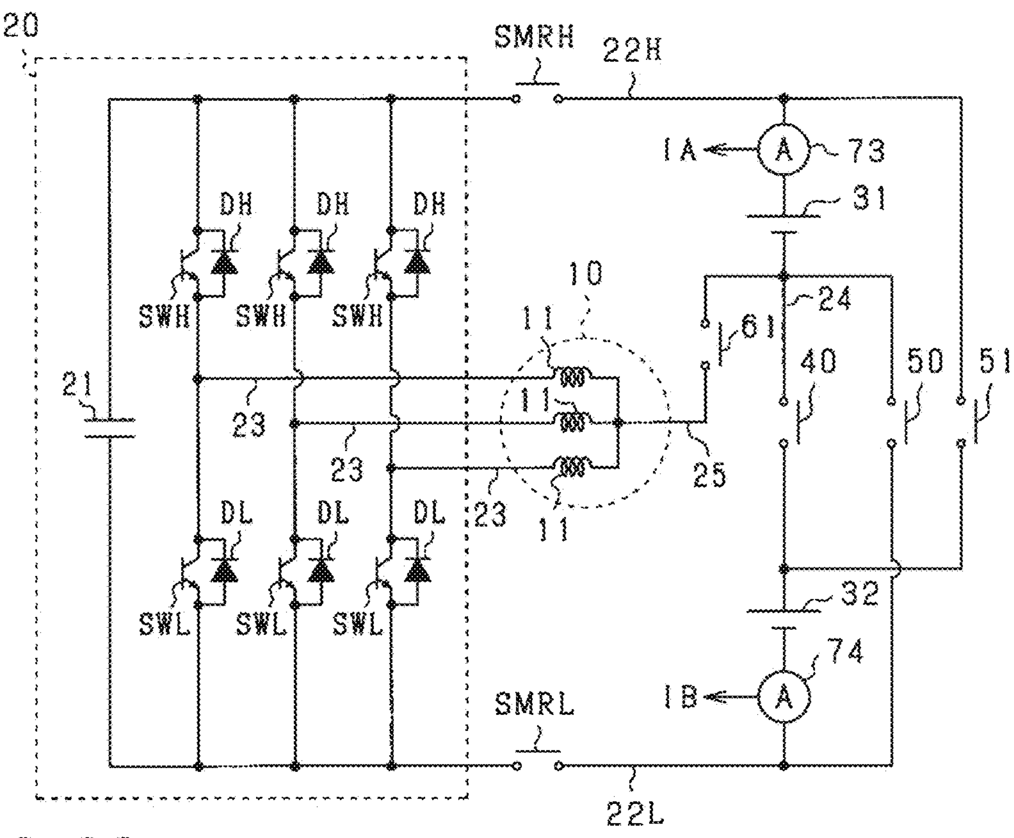
FIG. 19 is an overall structural diagram of a vehicular system according to a still further modification.

The negative-terminal bypass switch 50 can be additionally mounted to the configuration illustrated in FIG. 10 (see FIG. 19). In this modification, in each of the high-voltage charging mode and the charging routine illustrated in FIG. 14, the negative-terminal bypass switch 50 should be maintained in the off state.

Figure 20:
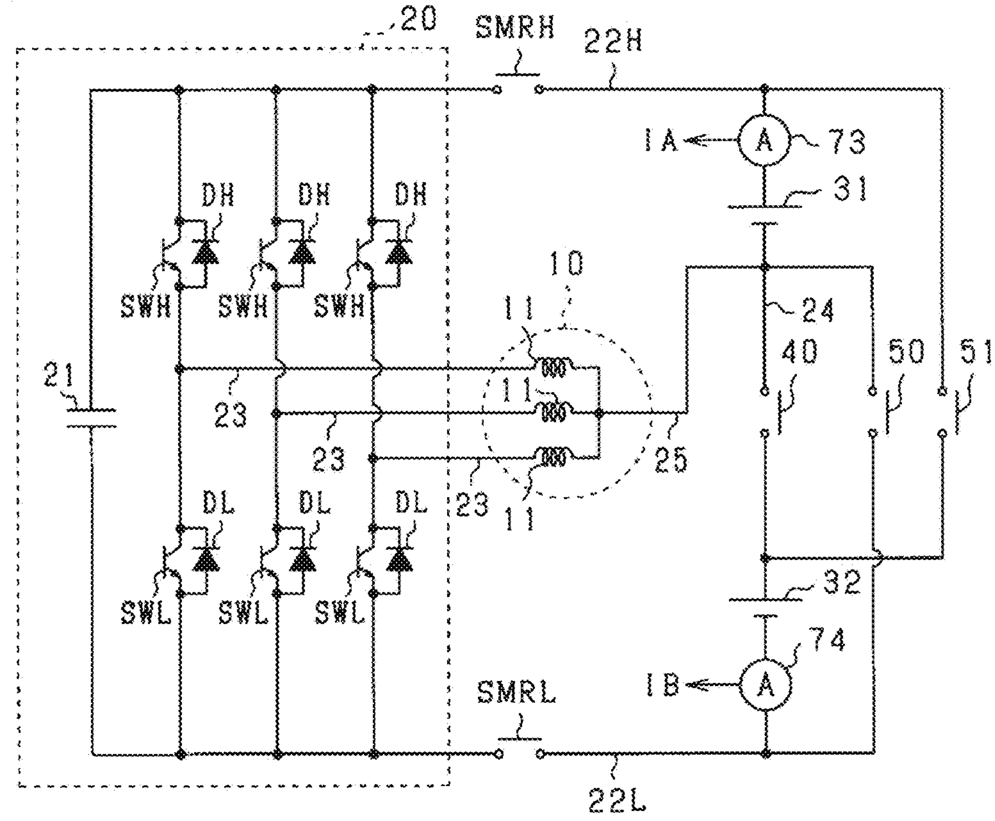
FIG. 20 is an overall structural diagram of a vehicular system according to a still further modification.

The motor-side switch 61 mounted on the motor-side electrical path 25 illustrated in FIG. 19 can be omitted (see FIG. 20).

Figure 21:
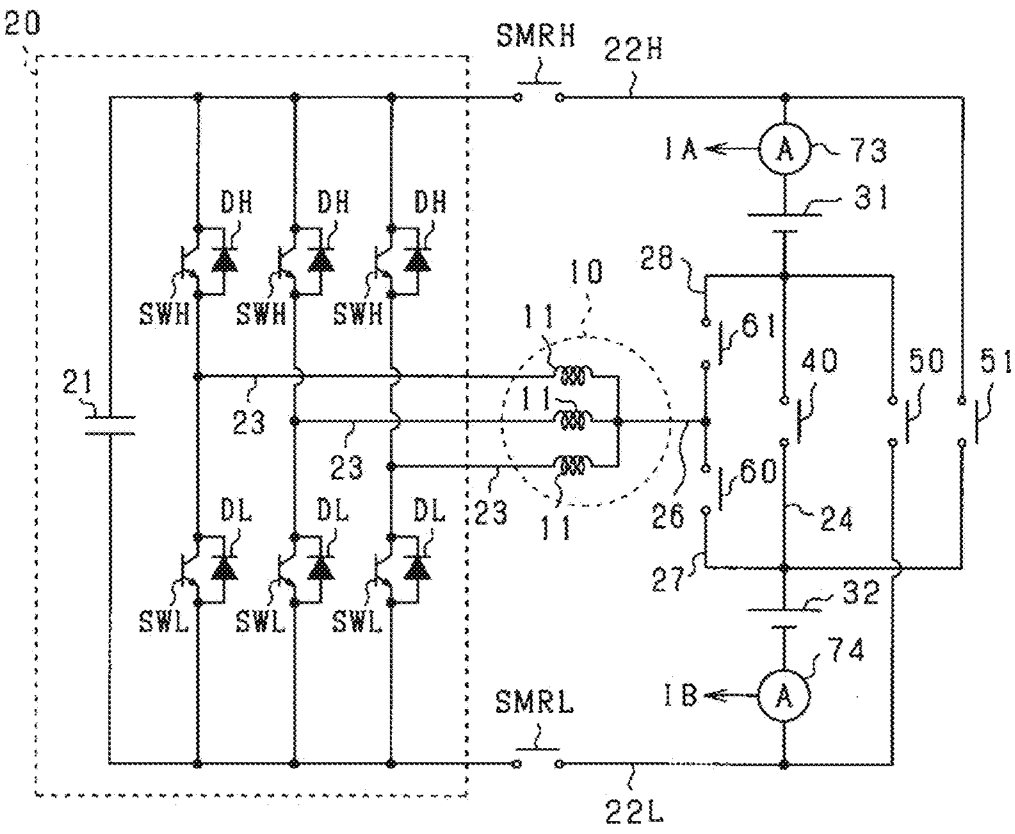
FIG. 21 is an overall structural diagram of a vehicular system according to a still further modification.

In addition to a motor-side switch connecting between the neutral point of the armature windings 11 and the negative terminal of the first battery 31, an additional motor-side switch connecting between the neutral point of the armature windings 11 and the positive terminal of the second battery 32 can be additionally provided (see FIG. 21).

In more detail, the power conversion apparatus illustrated in FIG. 21 includes a common path 26, a first electrical path 27, and a second electrical path 28, each of which has opposing first and second ends. The first end of the common path 26 is connected to the neutral point of the armature windings 11. The second end of the common path 26 is connected to the first terminal of the first electrical path 27. The inter-battery electrical path 24 is comprised of a first section between the inter-battery switch 40 and the negative terminal of the first battery 31 and a second section between the inter-battery switch 40 and the positive terminal of the second battery 32. The second end of the first electrical path 27 is connected to the second section of the inter-battery electrical path 24.

The second end of the common path 26 is connected to the first end of the second electrical path 28, and the second end of the second electrical path 28 is connected to the first section of the inter-battery electrical path 24.

A first motor-side switch 60 is mounted on the first electrical path 27, and a second motor-side switch 61 is mounted on the second electrical path 28. The first end of each of the first and second electrical paths 27 and 28 can be connected to the neutral point of the armature windings 11 with the common path 26 being omitted.

In each of the high-voltage charging mode and the charging routine, which is carried out by the power conversion apparatus illustrated in FIG. 21, each of the positive- and negative-terminal bypass switches 50 and 51 should be maintained in the off state. In each of the high-voltage charging mode and the charging routine, which is carried out by the power conversion apparatus illustrated in FIG. 14, each of the negative-terminal bypass switch 50 and the first motor-side switch 60 should be maintained in the off state.

Figure 22:
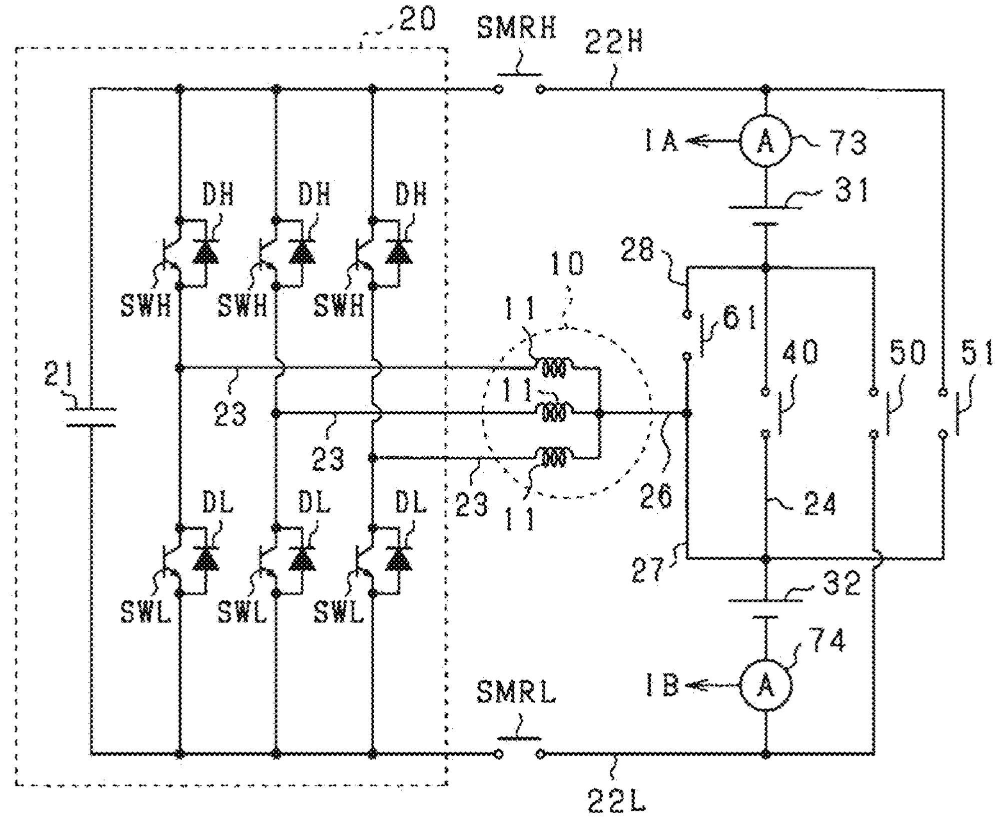
FIG. 22 is an overall structural diagram of a vehicular system according to a still further modification.

The first motor-side switch 60 mounted on the first electrical path 27 illustrated in FIG. 21 can be omitted (see FIG. 22).

Figure 23:
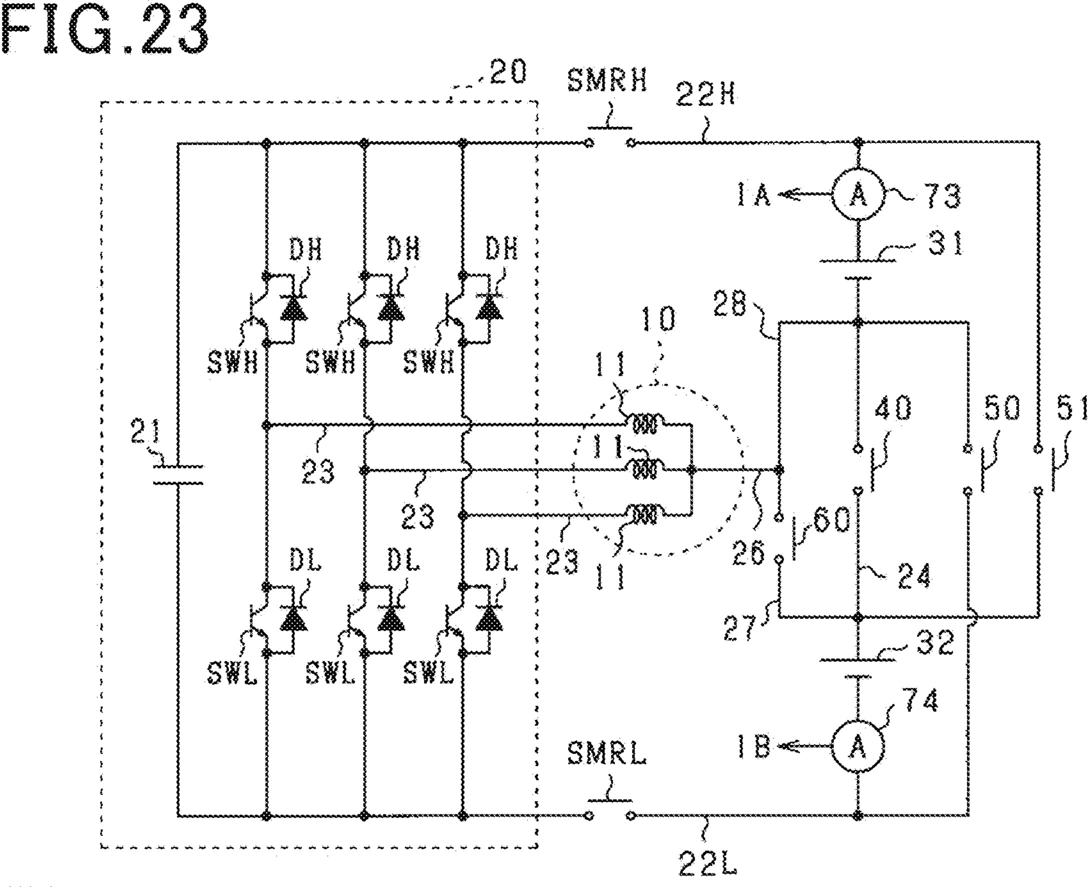
FIG. 23 is an overall structural diagram of a vehicular system according to a still further modification.

The second motor-side switch 61 mounted on the second electrical path 28 illustrated in FIG. 21 can be omitted (see FIG. 23).

Figure 24:
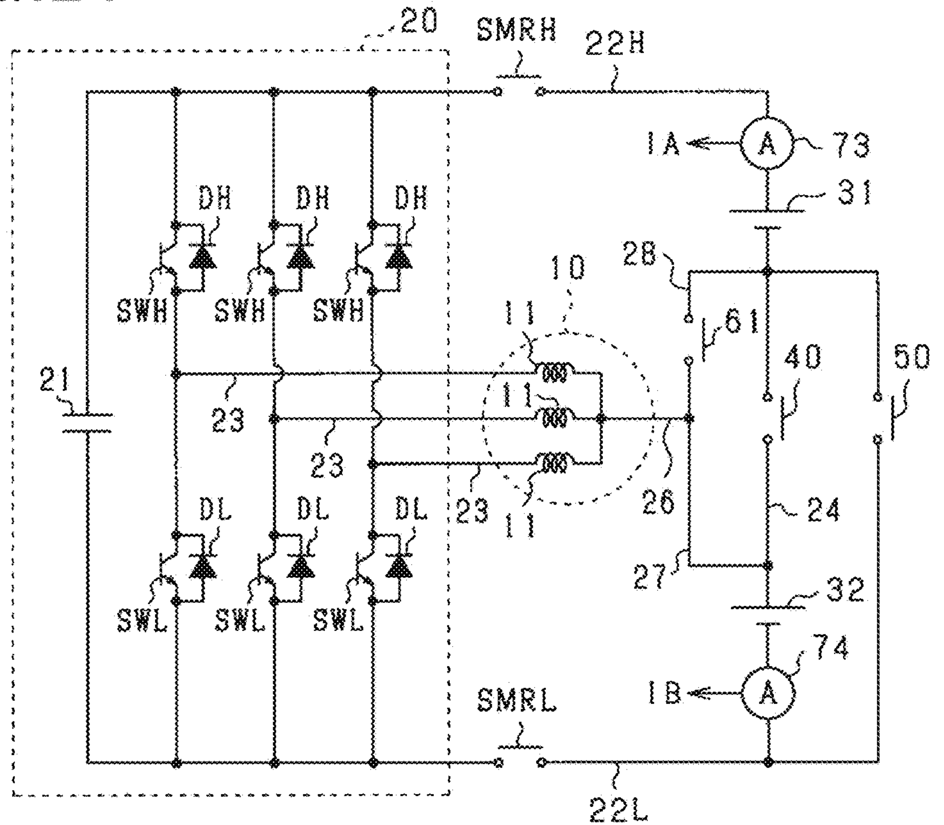
FIG. 24 is an overall structural diagram of a vehicular system according to a still further modification.

The positive-terminal bypass switch 51 illustrated in FIG. 22 can be omitted (see FIG. 24).

Figure 25:
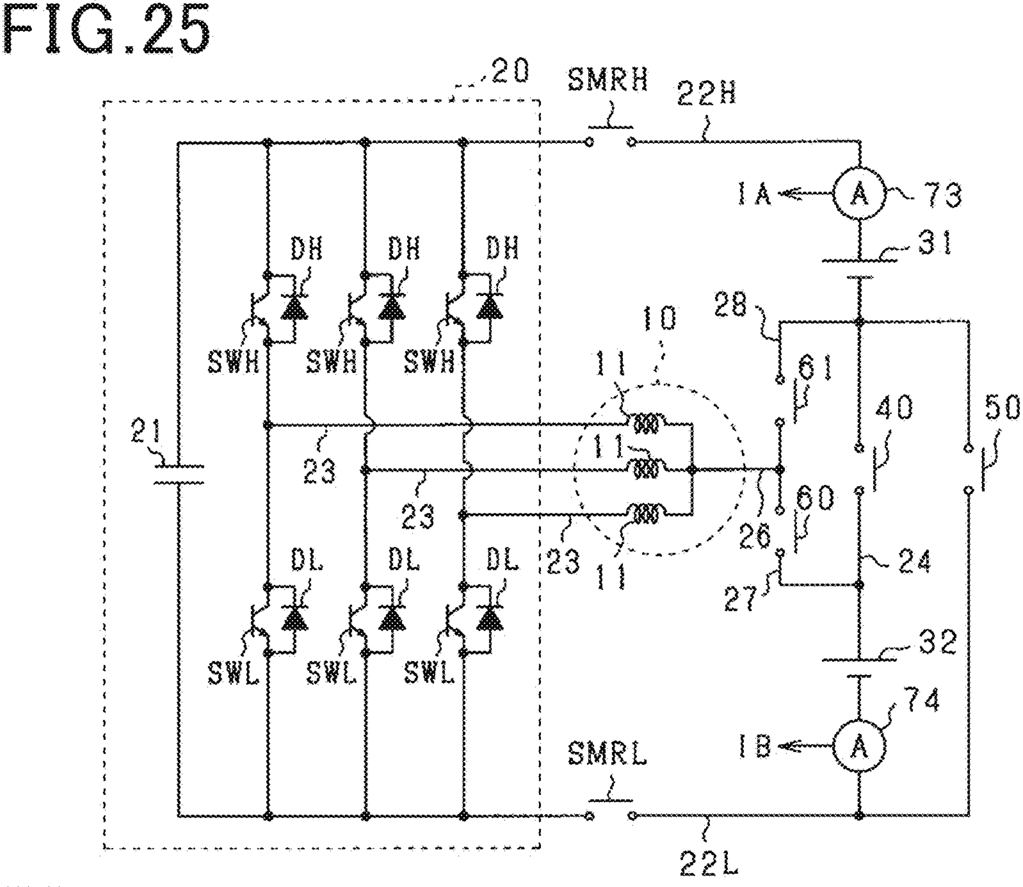
FIG. 25 is an overall structural diagram of a vehicular system according to a still further modification.

The positive-terminal bypass switch 51 illustrated in FIG. 21 can be omitted (see FIG. 25).

Figure 26:
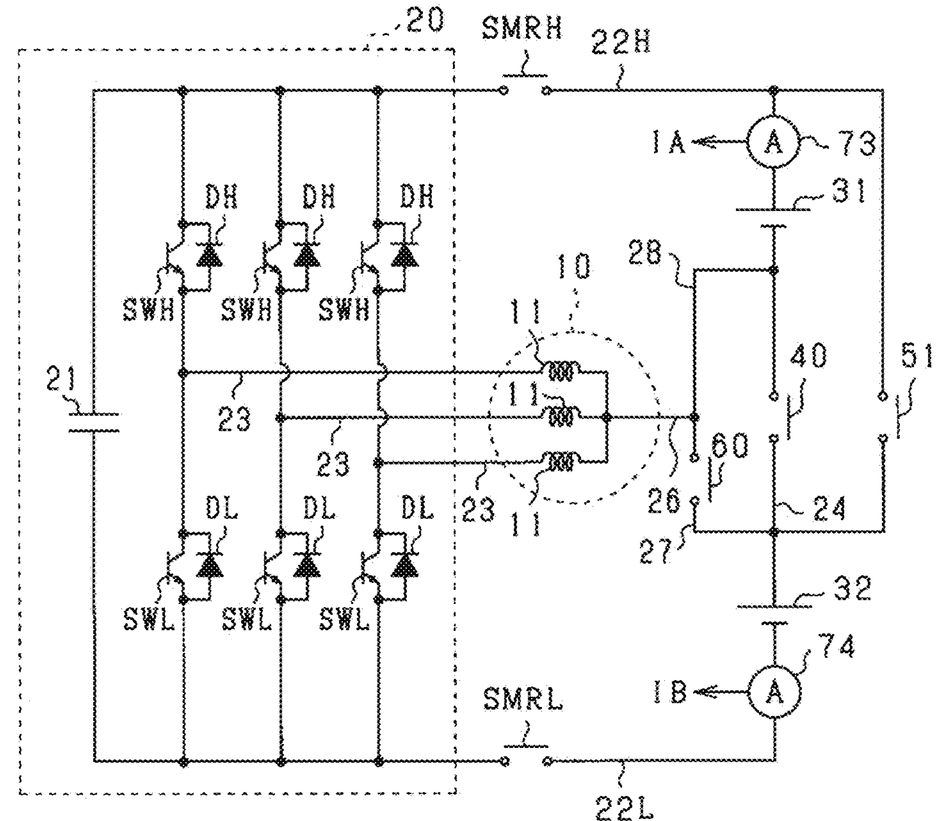
FIG. 26 is an overall structural diagram of a vehicular system according to a still further modification.

The negative-terminal bypass switch 50 illustrated in FIG. 23 can be omitted (see FIG. 26).

Figure 27:
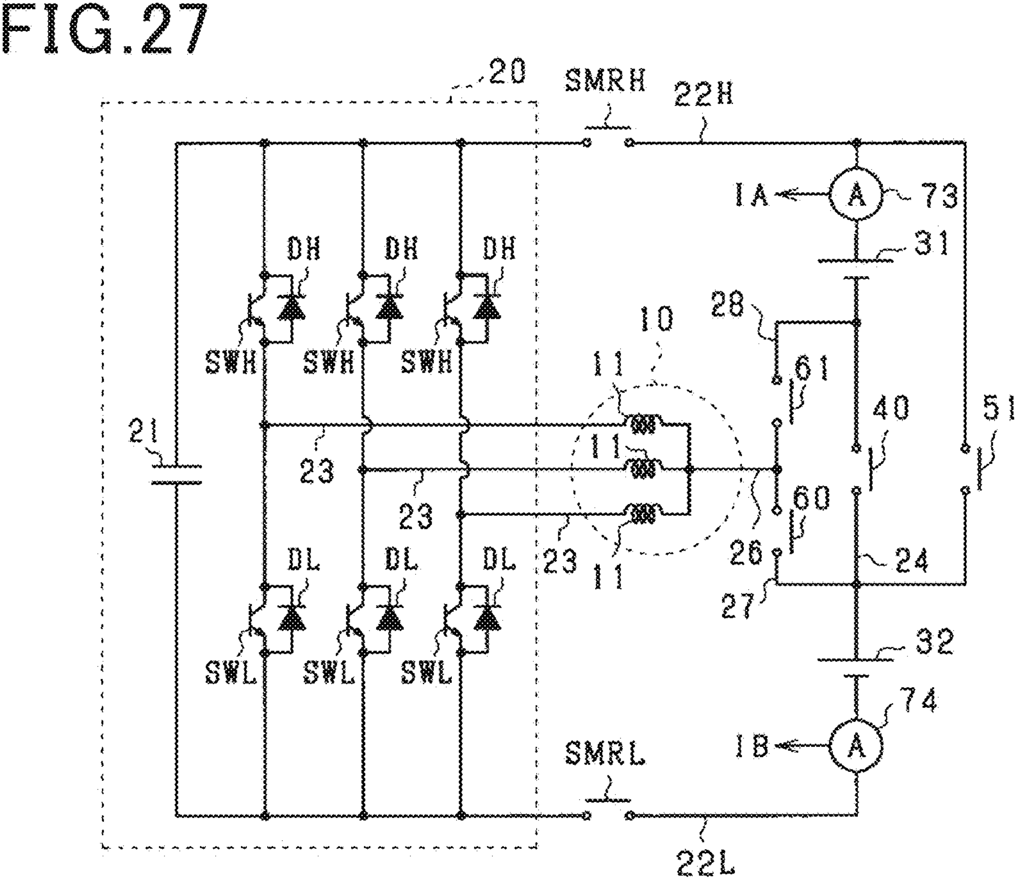
FIG. 27 is an overall structural diagram of a vehicular system according to a still further modification.

The negative-terminal bypass switch 50 illustrated in FIG. 21 can be omitted (see FIG. 27).

Figure 28:
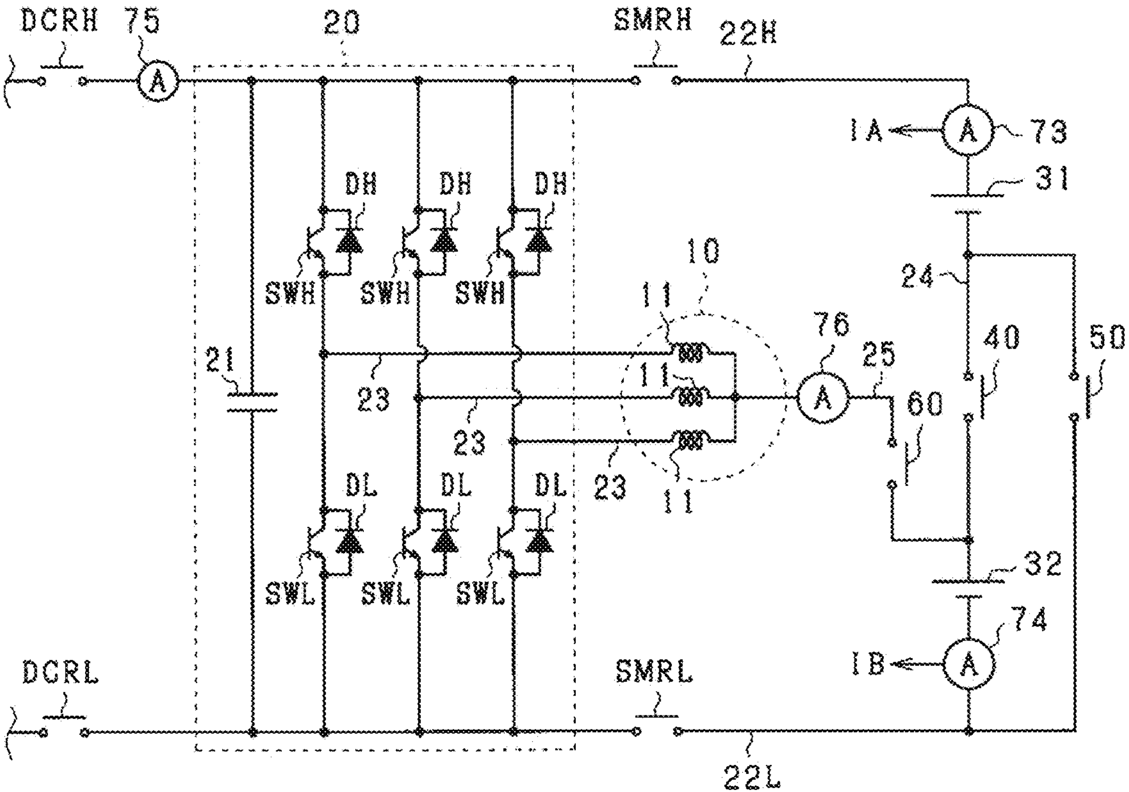
FIG. 28 is an overall structural diagram of a vehicular system according to a still further modification.

As illustrated in FIG. 28, a third current sensor 75 can be mounted on a section of the high-voltage electrical path 22H; the section is arranged between the high-side charge switch DCRH and the inverter 20. A fourth current sensor 76 can be mounted to any point on the motor-side electrical path 25. For example, the fourth current sensor 76 can be mounted on a section of the motor-side electrical path 25; the section is arranged between the motor-side switch 60 and the neutral point of the armature windings 11. One or two current sensors included in the first to fourth current sensors 73 to 76 can be omitted from the configuration illustrated in FIG. 28. This modification enables charging control of each of the first and second batteries 31 and 32 using minimal current sensors. Current sensors can be provided for measuring currents flowing through the respective conductors 23. The sum of the measurements of the currents flowing through the respective conductors 23 can be used in place of the measurement of the fourth current sensor 76.

Figure 29:
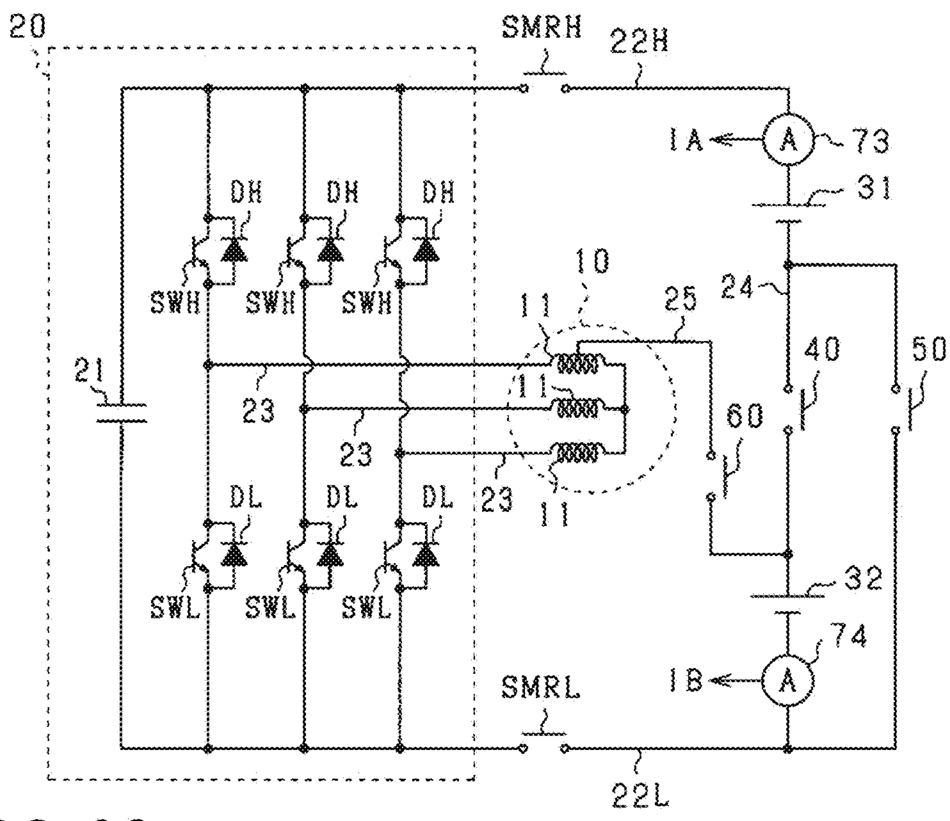
FIG. 29 is an overall structural diagram of a vehicular system according to a still further modification.

One of ends of the motor-side electrical path 25, which is connected to the neutral point of the armature windings 11, can be connected to the intermediate portion of any armature winding 11 (see FIG. 29).

Figure 30:
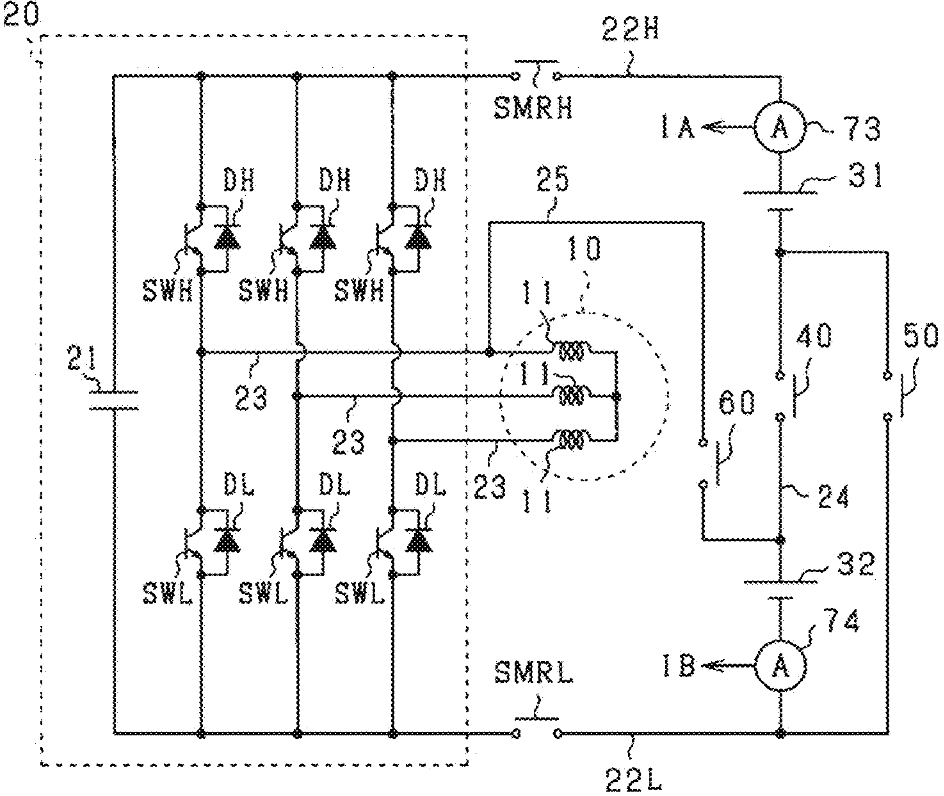
FIG. 30 is an overall structural diagram of a vehicular system according to a still further modification.
Figure 31:
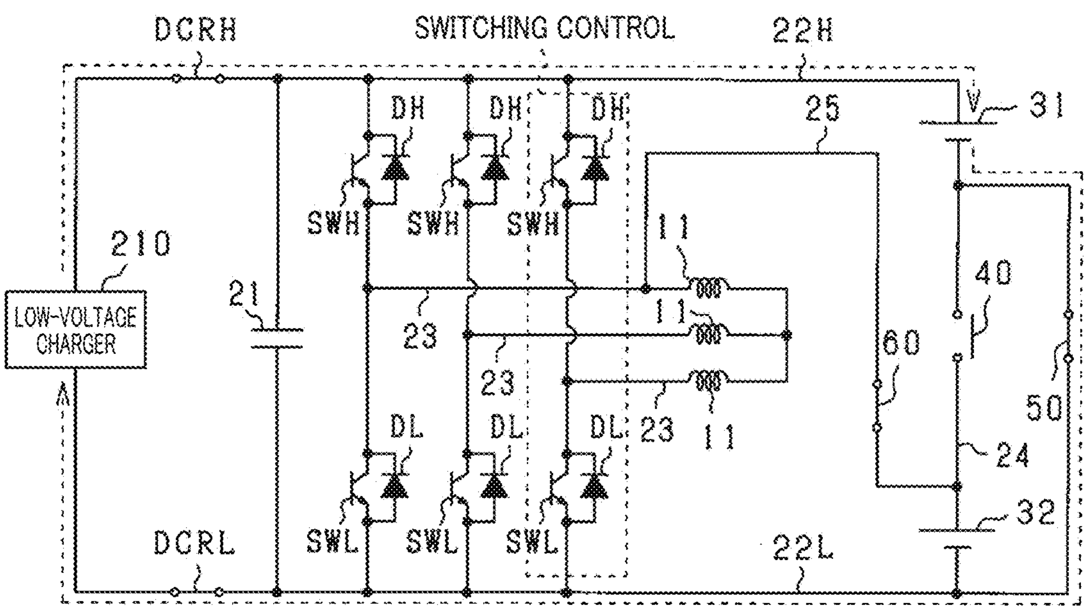
FIG. 31 is a circuit diagram illustrating how the switches are operated in the vehicular system illustrated in FIG. 30.

One of ends of the motor-side electrical path 25 can be connected to the conductor 23 of a selected-phase armature winding 11, which is for example illustrated in FIG. 30. In this modification, the control apparatus 100 can be configured to perform, as illustrated in FIG. 31, switching operations of turning off the upper- and lower-arm switches SWH and SWL connected to the conductor 23 of the selected-phase armature winding 11 and alternately turning on the upper- and lower-arm switches SWH and SWL of at least one phase winding other than the selected-phase armature winding.

Figure 32:
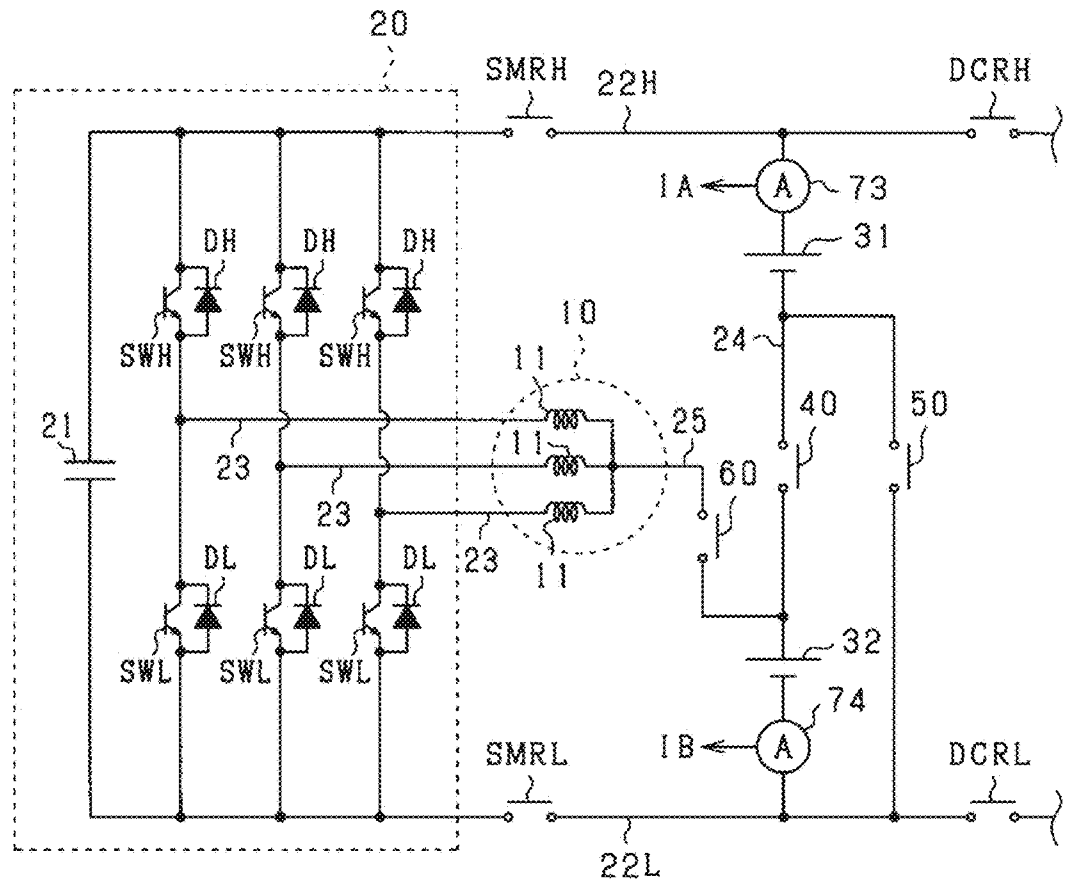
FIG. 32 is an overall structural diagram of a vehicular system according to a still further modification.

As illustrated in FIG. 32, the high-side charge switch DCRH and the positive-side connector can be mounted on a section of the high-side electrical path 22H; the section is arranged between the high-side main switch SMRH and the first battery 31. The low-side charge switch DCRL and the negative-side connector can be mounted on a section of the low-side electrical path 22L; the section is arranged between the low-side main switch SMRL and the second battery 32.

A first fuse can be connected between the positive terminal of the first battery 31 and the high-side electrical path 22H, and a second fuse can be connected between the negative terminal of the second battery 32 and the low-side electrical path 22L.

Each of the main switches SMRH and SMRL, the charge switches DCRH and DCRL, the inter-battery switch 40, the bypass switches 50 and 51, and the motor-side switches 60 and 61 is not limited to a single switch, and can be comprised of a series module of plural switches connected in series to each other or a parallel module of plural switches connected in parallel to each other.

Each of the upper- and lower-arm switches of the inverter 20 is not limited to an IGBT with a free-wheel diode connected in antiparallel thereto. Specifically, an N-channel MOSFET having an intrinsic diode can be used as each of the upper- and lower-arm switches of the inverter 20. If an N-channel MOSFET is used as each of the upper- and lower-arm switches of the inverter 20, the drain of the N-channel MOSFET serves as a high-side terminal, and the source of the N-channel MOSFET serves as a low-side terminal.

The connection configuration of the armature windings 11 of the motor 10 are not limited to the star configuration. Specifically, delta configuration can be used as the connection configuration of the armature windings 11 of the motor 10. Each of the motor 10 can be configured as a two-phase motor or a four or more-phase motor, and each inverter 20 can be configured as a two-phase inverter or a four or more-phase inverter.

The motor 10 is not limited to a permanent magnet synchronous machine that includes permanent magnets as field poles mounted to the rotor thereof. Specifically, the motor 10 can be configured as a wound field synchronous machine that includes field windings as field poles mounted to the rotor thereof. Such a wound field synchronous motor can include both permanent magnets and field windings mounted to the rotor thereof. The motor 10 is not limited to a synchronous machine, and can be configured as an induction machine.

Targets to be charged by an external charger are not limited to power storages. Specifically, electrical double layer capacitors with, for example, high capacity can be used as the targets to be charged by an external charger. Additionally, both power storages and electrical double layer capacitors can be used as the targets to be charged by an external charger.

Each power conversion apparatus according to the present disclosure is not limited being installed in a vehicle. Specifically, each power conversion apparatus according to the present disclosure can be installed in mobile objects, such as aircrafts or ships, or stationary objects.

The power conversion apparatuses and their methods according to the present disclosure can be implemented by a dedicated computer including a memory and a processor programmed to perform one or more functions embodied by one or more computer programs.

The power conversion apparatuses and their methods according to the present disclosure can also be implemented by a dedicated computer including a processor comprised of one or more dedicated hardware logic circuits.

The power conversion apparatuses and their methods according to the present disclosure can further be implemented by a processor system comprised of a memory, a processor programmed to perform one or more functions embodied by one or more computer programs, and one or more hardware logic circuits.

The one or more programs can be stored in a computer-readable non-transitory storage medium as instructions to be carried out by a computer or a processor.

While illustrative embodiments of the present disclosure have been described herein, the present disclosure is not limited to the embodiments described herein or disclosed configurations, but includes various modifications and adaptations and/or alternations within the equivalent scope of the descriptions. Additionally, various combinations, embodiments, combinations to which only one element or plural elements have been added, or modified embodiments to which only one element or plural elements have been added are within the category or scope of the present disclosure.

The invention claimed is:

1. A power conversion apparatus comprising:
- a high-side electrical path electrically connectable to a positive terminal of a first power storage and a positive terminal of an external charger;
- a low-side electrical path electrically connectable to a negative terminal of a second power storage and a negative terminal of the external charger;
- an inverter that includes:
  - an upper-arm switch electrically connected to the high-side electrical path; and
  - a lower-arm switch connected to the upper-arm switch and the low-side electrical path;
- a motor electrically connected to a connection point between the upper-arm switch and the lower-arm switch through a conductor;
- an inter-storage electrical path arranged to connect between a negative terminal of the first power storage and a positive terminal of the second power storage;
- an inter-storage switch mounted on the inter-storage electrical path;
- a bypass switch arranged to perform at least one of:
  - a first electrical connection between the negative terminal of the first power storage and the negative terminal of the second power storage; and
  - a second electrical connection between the positive terminal of the first power storage and the positive terminal of the second power storage;
- a motor-side electrical path arranged to electrically connect between the inter-storage electrical path and one of the armature winding and the conductor; and
- a controller configured to:
  - start charging of at least one of the first power storage and the second power storage through the external charger while the inter-storage switch is in an off state and the bypass switch is in an on state; and
  - perform, after the start of charging of the at least one of the first power storage and the second power storage, switching operations of the upper- and lower-arm switches of the inverter as a voltage adjustment task to cause an absolute difference between a first voltage across the first power storage and a second voltage across the second power storage to be smaller than or equal to a determination threshold.

2. The power conversion apparatus according to claim 1, wherein:
- the bypass switch is a negative-terminal bypass switch that electrically connects between the negative terminal of the first power storage and the negative terminal of the second power storage; and the motor-side electrical path is a path arranged to electrical connect between a section of the inter-storage electrical path and the armature winding, the section of the inter-storage electrical path being arranged between the inter-storage switch and the second power storage.

3. The power conversion apparatus according to claim 2, wherein:

the switching operations of the upper- and lower-arm switches of the inverter as the voltage adjustment task are configured to cause:

the absolute difference between the first voltage across the first power storage and the second voltage across the second power storage to be smaller than or equal to the determination threshold; and the first voltage across the first power storage to be higher than or equal to the second voltage across the second power storage.

4. The power conversion apparatus according to claim 3, wherein:

the controller is configured to:

determine, prior to the voltage adjustment task, whether the first voltage across the first power storage is lower than a specified value obtained by subtracting the determination threshold from the second voltage across the second power storage; and perform, upon determination that the first voltage across the first power storage is lower than the specified value, a preliminary charging task that charges only the first power storage through the external charger while the inter-battery switch is in the off state and the negative-terminal bypass switch is in the on state to cause the absolute difference between the first voltage across the first power storage and the second voltage across the second power storage to be smaller than or equal to the determination threshold.

5. The power conversion apparatus according to claim 3, wherein:

the controller is configured to:

determine, prior to the voltage adjustment task, whether the second voltage across the second power storage is lower than a specified value obtained by subtracting the determination threshold from the first voltage across the first power storage; and perform, upon determination that the second voltage across the second power storage is lower than the specified value, a preliminary charging task that charges only the second power storage through the external charger while each of the inter-battery switch and the negative-terminal bypass switch is in the off state and the upper-arm switch is in the on state to cause the absolute difference between the first voltage across the first power storage and the second voltage across the second power storage to be smaller than or equal to the determination threshold.

6. The power conversion apparatus according to claim 3, wherein:

the controller is configured to:

determine, prior to the voltage adjustment task, whether one of a first condition and a second condition is satisfied, the first condition representing that the second voltage across the second power storage is lower than the first voltage across the first power storage, the second condition representing that the absolute difference between the first voltage across the first power storage and the second voltage across the second power storage is smaller than or equal to the determination threshold; and perform, upon determination that one of the first condition and the second condition is satisfied, a preliminary charging task that causes the external charger to output a charging current and performs switching of the upper- and lower-arm switches of the inverter while the inter-battery switch is in the off state and the negative-terminal bypass switch is in the on state to accordingly cause:

charging power for the second power storage to be higher than charging power for the first power storage; and the absolute difference between the first voltage across the first power storage and the second voltage across the second power storage to be smaller than or equal to the determination threshold.

7. The power conversion apparatus according to claim 4, wherein:

charging power outputted from the external charger includes first charging power for the first power storage and second charging power for the second power storage; and the controller is configured to:

cause the external charger to output the charging current during a charging control period defined from a start time to an end time;

perform the preliminary charging task before a specific timing between the start time and the end time of the charging control period; and perform, after the specific timing in the charging control period, the switching operations of the upper- and lower-arm switches of the inverter as the voltage adjustment task to cause the second charging power for the second power storage to be higher than the first charging power for the first power storage, thus causing a first value of the absolute difference between the first voltage and the second voltage at the end time of the charging control period to be smaller than a second value of the absolute difference between the first voltage and the second voltage at the specific timing.

8. The power conversion apparatus according to claim 7, wherein:

the specific timing is a timing at which the first charging power for the first power storage included in the charging power outputted from the external charger becomes higher than allowable charging power for the first power storage.

9. The power conversion apparatus according to claim 7, wherein:

the external charger includes, as a charging mode thereof, a constant-current mode, a constant-voltage mode, and a constant-power mode; and the specific timing is a timing at which the charging mode of the external charger is switched from the constant-current mode to one of the constant-voltage mode and the constant-power mode.

10. The power conversion apparatus according to claim 7, wherein:

the specific timing is a timing defined to be earlier by predetermined time than the end time of the charging control period.

11. The power conversion apparatus according to claim 7, wherein:

the specific timing is a timing at which a present value of a state of charge of the first power storage reaches a particular value that is defined by subtracting a predetermined value from a target value of the state of charge for each of the first and second power storages at the end time of the charging control period.

12. The power conversion apparatus according to claim 1, wherein:

the bypass switch is a positive-terminal bypass switch that electrically connects between the positive terminal of the first power storage and the positive terminal of the second power storage; and the motor-side electrical path is a path arranged to electrical connect between a section of the inter-storage electrical path and the armature winding, the section of the inter-storage electrical path being arranged between the inter-storage switch and the first power storage.

13. The power conversion apparatus according to claim 12, wherein:

the switching operations of the upper- and lower-arm switches of the inverter as the voltage adjustment task are configured to cause:

the absolute difference between the first voltage across the first power storage and the second voltage across the second power storage to be smaller than or equal to the determination threshold; and the second voltage across the second power storage to be higher than or equal to the first voltage across the first power storage.

14. The power conversion apparatus according to claim 13, wherein:

the controller is configured to:

determine, prior to the voltage adjustment task, whether the second voltage across the second power storage is lower than a specified value obtained by subtracting the determination threshold from the first voltage across the first power storage; and perform, upon determination that the second voltage across the second power storage is lower than the specified value, a preliminary charging task that charges only the second power storage through the external charger while the inter-battery switch is in the off state and the positive-terminal bypass switch is in the on state to cause the absolute difference between the first voltage across the first power storage and the second voltage across the second power storage to be smaller than or equal to the determination threshold.

15. The power conversion apparatus according to claim 13, wherein:

the controller is configured to:

determine, prior to the voltage adjustment task, whether the first voltage across the first power storage is lower than a specified value obtained by subtracting the determination threshold from the second voltage across the second power storage; and perform, upon determination that the first voltage across the first power storage is lower than the specified value, a preliminary charging task that charges only the first power storage through the external charger while each of the inter-battery switch and the positive-terminal bypass switch is in the off state and the lower-arm switch is in the on state to cause the absolute difference between the first voltage across the first power storage and the second voltage across the second power storage to be smaller than or equal to the determination threshold.

16. The power conversion apparatus according to claim 13, wherein:

the controller is configured to:

determine, prior to the voltage adjustment task, whether one of a first condition and a second condition is satisfied, the first condition representing that the first voltage across the first power storage is lower than the second voltage across the second power storage, the second condition representing that the absolute difference between the first voltage across the first power storage and the second voltage across the second power storage is smaller than or equal to the determination threshold; and perform, upon determination that one of the first condition and the second condition is satisfied, a preliminary charging task that causes the external charger to output a charging current and performs switching of the upper- and lower-arm switches of the inverter while the inter-battery switch is in the off state and the positive-terminal bypass switch is in the on state to accordingly cause:

charging power for the first power storage to be higher than charging power for the second power storage; and the absolute difference between the first voltage across the first power storage and the second voltage across the second power storage to be smaller than or equal to the determination threshold.

17. The power conversion apparatus according to claim 14, wherein:

charging power outputted from the external charger includes first charging power for the first power storage and second charging power for the second power storage; and the controller is configured to:

cause the external charger to output the charging current during a charging control period defined from a start time to an end time;

perform the preliminary charging task before a specific timing between the start time and the end time of the charging control period; and perform, after the specific timing in the charging control period, the switching operations of the upper- and lower-arm switches of the inverter as the voltage adjustment task to cause the first charging power for the first power storage to be higher than the second charging power for the second power storage, thus causing a first value of the absolute difference between the first voltage and the second voltage at the end time of the charging control period to be smaller than a second value of the absolute difference between the first voltage and the second voltage at the specific timing.

18. The power conversion apparatus according to claim 17, wherein:

the specific timing is a timing at which the second charging power for the second power storage included in the charging power outputted from the external charger becomes higher than allowable charging power for the second power storage.

19. The power conversion apparatus according to claim 17, wherein:

the external charger includes, as a charging mode thereof, a constant-current mode, a constant-voltage mode, and a constant-power mode; and the specific timing is a timing at which the charging mode of the external charger is switched from the constant-current mode to one of the constant-voltage mode and the constant-power mode.

20. The power conversion apparatus according to claim 17, wherein:

the specific timing is a timing defined to be earlier by predetermined time than the end time of the charging control period.

21. The power conversion apparatus according to claim 17, wherein:

the specific timing is a timing at which a present value of a state of charge of the second power storage reaches a particular value that is defined by subtracting a predetermined value from a target value of the state of charge for each of the first and second power storages at the end time of the charging control period.

22. A program product applicable to a power conversion apparatus that comprises:

a high-side electrical path electrically connectable to a positive terminal of a first power storage and a positive terminal of an external charger;

a low-side electrical path electrically connectable to a negative terminal of a second power storage and a negative terminal of the external charger;

an inverter that includes an upper-arm switch electrically connected to the high-side electrical path and a lower-arm switch connected to the low-side electrical path;

a motor electrically connected to a connection point between the upper-arm switch and the lower-arm switch through a conductor;

a computer;

an inter-storage electrical path arranged to connect between a negative terminal of the first power storage and a positive terminal of the second power storage;

an inter-storage switch mounted on the inter-storage electrical path;

a bypass switch arranged to perform at least one of:

a first electrical connection between the negative terminal of the first power storage and the negative terminal of the second power storage; and a second electrical connection between the positive terminal of the first power storage and the positive terminal of the second power storage; and a motor-side electrical path arranged to electrically connect between the inter-storage electrical path and one of the armature winding and the conductor, the program product comprising:

a non-transitory storage medium; and program instructions stored in the non-transitory storage medium, the program instructions causing the computer to:

start charging of at least one of the first power storage and the second power storage through the external charger while the inter-storage switch is in an off state and the bypass switch is in an on state; and perform, after the start of charging of the at least one of the first power storage and the second power storage, switching operations of the upper- and lower-arm switches of the inverter as a voltage adjustment task to cause an absolute difference between a first voltage across the first power storage and a second voltage across the second power storage to be smaller than or equal to a determination threshold.

* * * * *